United States Patent
Zhang et al.

(10) Patent No.: US 9,880,035 B2
(45) Date of Patent: Jan. 30, 2018

(54) METHOD AND SYSTEM FOR DETECTING COKING GROWTH AND MALDISTRIBUTION IN REFINERY EQUIPMENT

(71) Applicants: Yibing Zhang, Annandale, NJ (US); Limin Song, West Windsor, NJ (US); Geoff Keiser, Morris Plains, NJ (US); Michael Louis Hergenrother, Kingwood, TX (US); Berne K. Stober, Esmont, VA (US); Patricia H. Kalamaras, Milford, NJ (US); Benjamin Santiago Umansky, Fairfax, VA (US)

(72) Inventors: Yibing Zhang, Annandale, NJ (US); Limin Song, West Windsor, NJ (US); Geoff Keiser, Morris Plains, NJ (US); Michael Louis Hergenrother, Kingwood, TX (US); Berne K. Stober, Esmont, VA (US); Patricia H. Kalamaras, Milford, NJ (US); Benjamin Santiago Umansky, Fairfax, VA (US)

(73) Assignee: EXXONMOBIL RESEARCH AND ENGINEERING COMPANY, Annandale, NJ (US)

(*) Notice: Subject to any disclaimer, the term of this patent is extended or adjusted under 35 U.S.C. 154(b) by 616 days.

(21) Appl. No.: 14/226,939

(22) Filed: Mar. 27, 2014

(65) Prior Publication Data
US 2015/0268078 A1  Sep. 24, 2015

Related U.S. Application Data

(60) Provisional application No. 61/806,115, filed on Mar. 28, 2013.

(51) Int. Cl.
G01N 25/00 (2006.01)
G01F 1/688 (2006.01)
(Continued)

(52) U.S. Cl.
CPC ............ G01F 1/6884 (2013.01); B01D 3/04 (2013.01); B01D 3/42 (2013.01); B01J 8/001 (2013.01);
(Continued)

(58) Field of Classification Search
CPC ... G01F 1/6884; G01F 25/0007; C10G 75/00; G01K 11/32; G01K 11/3206; B01J 8/02;
(Continued)

(56) References Cited

U.S. PATENT DOCUMENTS 3,396,100 A   8/1968  Pettefer
3,667,285 A   6/1972  Wright et al.
(Continued)

FOREIGN PATENT DOCUMENTS

DE        10149092 A1      4/2003
DE    102004031324    *    1/2006
(Continued)

OTHER PUBLICATIONS

J. Courivaud et al., "Fiber Optics Based Monitoring of Levees and Embankment Dams", 31st Annual USSD Conference, San Diego, California, Apr. 11-15, 2011.
(Continued)

*Primary Examiner* — Lisa Caputo
*Assistant Examiner* — Janice M Soto
(74) *Attorney, Agent, or Firm* — Glenn T. Barrett

(57) ABSTRACT

Systems and methods for detecting coking in a wash bed of a vacuum pipe still with a sensing cable including an optical fiber sensor array aligned with a heating element disposed in the vessel. An optical signal interrogator is configured to
(Continued)

measure a first temperature profile at a plurality of sensor locations to determine a flow distribution. An excitation source is configured to propagate at least one heat pulse through the heating element and the optical signal interrogator is configured to measure a second temperature profile corresponding to the heat pulse at the sensor locations. A control unit is configured to detect coking by determining one or more properties of the media exposed to the sensing cable at each of the plurality of sensor locations based on the second temperature profile corresponding thereto.

39 Claims, 17 Drawing Sheets

(51) Int. Cl.
| | | |
|---|---|---|
| G01K 11/32 | (2006.01) | |
| B01D 3/04 | (2006.01) | |
| B01D 3/42 | (2006.01) | |
| G01F 25/00 | (2006.01) | |
| B01J 19/00 | (2006.01) | |
| B01J 19/18 | (2006.01) | |
| B01J 8/00 | (2006.01) | |
| B01J 8/02 | (2006.01) | |
| C10G 75/00 | (2006.01) | |

(52) U.S. Cl.
CPC .............. *B01J 8/02* (2013.01); *B01J 8/0292* (2013.01); *B01J 19/0013* (2013.01); *B01J 19/0026* (2013.01); *B01J 19/1812* (2013.01); *C10G 75/00* (2013.01); *G01F 25/0007* (2013.01); *G01K 11/32* (2013.01); *G01K 11/3206* (2013.01); *B01J 2208/00061* (2013.01); *B01J 2208/00415* (2013.01); *B01J 2208/00424* (2013.01); *B01J 2208/00548* (2013.01); *B01J 2219/002* (2013.01); *B01J 2219/00063* (2013.01); *B01J 2219/00135* (2013.01); *B01J 2219/00137* (2013.01); *B01J 2219/00164* (2013.01); *B01J 2219/00209* (2013.01); *B01J 2219/00243* (2013.01); *B01J 2219/00247* (2013.01)

(58) Field of Classification Search
CPC ...... B01J 8/001; B01J 19/0026; B01J 8/0292; B01J 19/1812; B01J 2219/00209; B01J 2208/00548; B01J 2219/00164; B01J 2219/00063; B01J 2208/00415; B01J 2219/00243; B01J 2219/00137; B01J 2219/00247; B01J 2219/00135; B01J 2208/00424; B01J 2208/00061; B01J 2219/002; B01D 3/42; B01D 3/04; C10B 21/10; G01N 25/00

See application file for complete search history.

(56) References Cited

U.S. PATENT DOCUMENTS

| | | | |
|---|---|---|---|
| 4,200,550 A | 4/1980 | Scherrer et al. | |
| 4,529,029 A | 7/1985 | Block | |
| 4,628,743 A | 12/1986 | Miller, Jr. et al. | |
| 4,722,781 A | 2/1988 | Swartz et al. | |
| 4,824,555 A | 4/1989 | Paspek et al. | |
| 4,938,876 A | 7/1990 | Ohsol | |
| 5,219,471 A | 6/1993 | Goyal et al. | |
| 5,712,275 A | 1/1998 | Van Gestel | |
| 5,882,506 A | 3/1999 | Ohsol et al. | |
| 6,450,257 B1 | 9/2002 | Douglas | |
| 6,581,445 B1 | 6/2003 | Weiss | |
| 6,633,625 B2 | 10/2003 | Jackson et al. | |
| 6,853,798 B1 | 2/2005 | Weiss | |
| 7,240,547 B2 | 7/2007 | Brown | |
| 7,261,805 B2 | 8/2007 | Grove et al. | |
| 7,731,421 B2 | 6/2010 | Hadley et al. | |
| 7,886,109 B2 | 2/2011 | Yamamoto et al. | |
| 8,123,400 B2 | 2/2012 | Andrejco et al. | |
| 8,303,804 B2 | 11/2012 | Helton et al. | |
| 8,346,492 B2 | 1/2013 | Yang et al. | |
| 8,584,519 B2 | 11/2013 | Maida et al. | |
| 9,074,921 B1 | 7/2015 | Parker, Jr. et al. | |
| 2003/0094281 A1* | 5/2003 | Tubel | E21B 47/00 166/250.03 |
| 2004/0037752 A1* | 2/2004 | Herzog | G01K 11/32 422/131 |
| 2005/0011199 A1* | 1/2005 | Grisham | F25B 21/02 62/3.7 |
| 2005/0247446 A1 | 11/2005 | Gawthrop | |
| 2006/0010973 A1* | 1/2006 | Brown | G01F 1/68 73/204.11 |
| 2006/0214098 A1* | 9/2006 | Ramos | E21B 47/09 250/256 |
| 2007/0158064 A1* | 7/2007 | Pribnow | G01F 1/6884 166/250.01 |
| 2007/0234788 A1* | 10/2007 | Glasbergen | E21B 47/065 73/152.12 |
| 2008/0128069 A1 | 6/2008 | Sakrowski | |
| 2008/0130707 A1 | 6/2008 | Yamamoto et al. | |
| 2008/0239468 A1 | 10/2008 | Hamada | |
| 2008/0317095 A1 | 12/2008 | Hadley et al. | |
| 2009/0007652 A1 | 1/2009 | Childers | |
| 2009/0322544 A1 | 12/2009 | McDowell | |
| 2010/0247027 A1 | 9/2010 | Xia et al. | |
| 2012/0024758 A1 | 2/2012 | Love | |
| 2012/0080357 A1 | 4/2012 | Novak et al. | |
| 2013/0072739 A1* | 3/2013 | Ruettinger | B01J 21/12 585/662 |
| 2013/0125643 A1 | 5/2013 | Batty et al. | |
| 2014/0290335 A1 | 10/2014 | Shanks | |
| 2014/0290343 A1 | 10/2014 | Kulkarni et al. | |
| 2014/0290357 A1 | 10/2014 | Zhang et al. | |
| 2014/0294040 A1 | 10/2014 | Zhang et al. | |
| 2014/0294041 A1 | 10/2014 | Zhang et al. | |
| 2015/0177042 A1 | 6/2015 | Song et al. | |

FOREIGN PATENT DOCUMENTS

| | | | |
|---|---|---|---|
| GB | 2484990 | * | 2/2012 |
| GB | 2496863 A | * | 5/2013 |
| WO | 03/050576 A1 | | 6/2003 |
| WO | 2005/064117 A1 | | 7/2005 |
| WO | 2008/116069 A1 | | 9/2008 |

OTHER PUBLICATIONS

P.E. Sanders et al., "Recent Developments in Fiber Optic Sensor Technology for High Temperature Well Monitoring", GRC Transactions, vol. 33, 2009, pp. 859-863.

Zhang, Yibing et al., "Applications of Optical Fiber Sensors in the Oil Refining and Petrochemical Industries", IEEE, 2011, pp. 246-249.

* cited by examiner

METHOD AND SYSTEM FOR DETECTING COKING GROWTH AND MALDISTRIBUTION IN REFINERY EQUIPMENT

CROSS REFERENCE TO RELATED APPLICATION

This application relates and claims priority to U.S. Provisional Patent Application No. 61/806,115, filed on Mar. 28, 2013.

FIELD

The presently disclosed subject matter relates to methods and systems for detecting coking and flow maldistribution in a wash bed of a vacuum pipe still distillation tower. More particularly, the presently disclosed subject matter relates to detecting coking and flow maldistribution in a wash bed of a vacuum pipe still distillation tower using a sensing cable including an optical fiber sensor array aligned with a heating element.

BACKGROUND

Components of certain equipment, such as that used in the petroleum and petrochemical industry, which includes the exploration, production, refining, manufacture, supply, transport, formulation or blending of petroleum, petrochemicals, or the direct compounds thereof, are often monitored to maintain reliable operation. However, such components can involve harsh conditions, such as high temperature, high pressure, and/or a corrosive environment, making it difficult or costly to obtain reliable measurements.

Detection of coking formation in a wash bed of a vacuum pipe still (VPS) distillation tower can allow operators to alter operating parameters to increase utilization of the bed and thus enhance operations. For example, detecting coking formation at an early stage and knowing its location within the wash bed in the VPS distillation tower can allow for mitigation strategies such as increasing the flow rate of wash oil to remove the coking.

Conventional techniques for detection of coking/fouling, and/or corresponding maldistribution resulting from such coking in such equipment as catalytic hydroprocessing reactors, can include monitoring temperature distribution to identify hotspots and infer flow distribution. Such techniques often rely on multiple thermocouples to monitor temperature distribution, e.g., inside fixed bed catalytic hydroprocessing reactors. However, the number of thermocouples used for hot-spot detection within a VPS wash bed or reactor catalyst bed can be limited by the space inside the bed and the cost of installation and maintenance. Thus, it can be difficult to provide adequate coverage inside the fixed bed space for sufficient hot spot detection. Likewise, flow conditions inferred from the limited point temperature measurements provided by thermocouples, constrained by the physical size of the thermocouples as well as the cost of installation and maintenance, can be inaccurate.

Other techniques to detect coking, and/or corresponding flow maldistribution, can include monitoring the delta pressure between the top and bottom of the wash bed. However, this technique is not without disadvantages, such as for vacuum tower wash beds, where the pressure drop is typically only on the order of a few mmHg in these wash beds when coking occurs. Thus, pressure measurement can be a highly unreliable indicator of coking. Similarly, temperature differentials between bulk temperatures have also been used to detect coking. However, this technique involves a gross measurement and thus not necessarily accurate.

Accordingly, there is a continued need for improved techniques for detecting coking/fouling growth and maldistribution in components of refinery equipment such as a wash bed of a VPS distillation tower.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings. To achieve these and other advantages and in accordance with the purpose of the disclosed subject matter, as embodied and broadly described, the disclosed subject matter includes systems and methods for detecting coking in a wash bed of a vacuum pipe still. Although the disclosures herein may be described in relation to the use in a wash bed of a vacuum pipe still, such technology as described herein will generally also be applicable in a similar manner to the installation and use in detecting localized coking, as well as flow maldistributions, in a catalytic hydroprocessing reactor catalyst bed.

In accordance with one aspect of the disclosed subject matter, a method for detecting coking in a wash bed of a vacuum pipe still includes providing within a vacuum pipe still a sensing cable including an optical fiber sensor array aligned with a heating element and measuring a first temperature profile of the sensing cable at a plurality of sensor locations. The method includes determining a flow distribution of fluids within the vacuum pipe still by identifying a first set of sensor locations of the sensing cable exposed to vapor and a second set of sensor locations of the sensing cable exposed to liquid based on the first temperature profile. The method includes propagating at least one heat pulse through the heating element along at least a portion of the sensing cable to affect an exchange of thermal energy between the heating element and media, including the fluids, exposed to the sensing cable. The method includes measuring, over time, at least a second temperature profile of the sensing cable corresponding to the heat pulse at each of the plurality of sensor locations of the optical fiber sensor array. The method includes detecting coking by determining one or more properties of the media exposed to the sensing cable at each of the plurality of sensor locations based on the second temperature profile corresponding thereto.

In certain embodiments, measuring the first temperature can further include propagating a heat pulse through the heating element along at least a portion of the sensing cable and, for each sensor location, measuring at least a heating temperature measurement during propagation of the heat pulse over the sensor location, a peak temperature measurement, and a cooling temperature measurement after propagation of the heat pulse over the sensor. Determining the flow distribution of the fluids exposed to the sensing can include calculating a difference in the heating temperature measurement, the peak temperature measurement, the cooling temperature measurement, or combination thereof, between sensor locations, wherein the difference indicates a change in fluid characteristic proximal at least one of the plurality of sensor locations if the difference exceeds a predetermined threshold.

As embodied herein, measuring the second temperature profile corresponding to the heat pulse at each of the plurality of sensor locations can include, for each sensor location, measuring a plurality of temperatures over a period of time upon arrival the heat pulse at the sensor location. Detecting coking can include, for each temperature profile, performing a regression of the plurality of temperatures over a logarithm of corresponding measurement times for a predetermined time window in the period of time to generate a slope and an intercept of the regression, wherein the slope and the intercept indicate a coking deposit proximal the sensor location. Additionally or alternatively, detecting coking can include, for each temperature profile, generating a time derivative by calculating a derivative of the plurality of temperature measurements with respect to time, applying a transform to the time derivative to generate a complex spectrum, and determining an amplitude and a phase of the complex spectrum, wherein the amplitude and the phase of the complex spectrum indicate a coking deposit proximal the sensor location. Detecting coking can further include generating a frequency derivative spectrum by calculating the derivative of the complex spectrum with respect to frequency, and determining an amplitude and a phase of the frequency derivative spectrum, wherein the amplitude and the phase of the frequency derivative spectrum indicate a coking deposit proximal the sensor location.

In certain embodiments, determining the flow distribution of the fluids can further include detecting a misdistribution condition in the wash bed by monitoring the second temperature profile corresponding to each of the plurality of sensor locations, and comparing the monitored temperature profiles to predetermined temperature profiles corresponding to a desired operation condition. Alternatively, determining the flow of the fluids within the vacuum pipe still can further include detecting a misdistribution condition in the wash bed by monitoring the second temperature profile corresponding to each of the plurality of sensor locations and at least a third temperature profile corresponding to each of the plurality of sensor locations, and comparing the second and third temperature profiles to detect a change in operation condition. The sensing cable can disposed in a grid configuration within the wash bed, and the method can include generating a multi-dimensional flow distribution based on the first temperature profile corresponding to each sensor location.

In accordance with another aspect of the disclosed subject matter, a system for detecting coking in a wash bed of a vacuum pipe still includes a sensing cable including an optical fiber sensor array aligned with a heating element disposed in the wash bed, the optical fiber sensor array having a plurality of sensor locations. The system includes an optical signal interrogator coupled with the optical fiber sensor array and adapted to receive a signal from each of the plurality of sensor locations and configured to measure a first temperature profile of the sensing cable at the plurality of sensor locations. The system includes a control unit, coupled with the heating element and the optical signal interrogator, configured to determine a flow distribution of fluids within the vacuum pipe still by identifying a first set of sensor locations of the sensing cable exposed to vapor and a second set of sensor locations of the sensing cable exposed to liquid based on the first temperature profile. The system includes an excitation source coupled with the heating element configured to propagate at least one heat pulse through the heating element along at least a portion of the sensing cable to affect an exchange of thermal energy between the heating element and media, including the fluids, exposed to the sensing cable. The optical signal interrogator is configured to measure, over time, a second temperature profile of the sensing cable corresponding to the heat pulse at each of the plurality of sensor locations on the optical fiber sensor array. The control unit is configured to detect coking by determining one or more properties of the media exposed to the sensing cable at each of the plurality of sensor locations based on the second temperature profile corresponding thereto.

As embodied herein, the optical signal interrogator can be configured, for each of the plurality of sensor locations, to measure a plurality of temperatures over a period of time upon arrival of the heat pulse at the sensor location. The control unit can be configured, for each temperature profile, to perform a regression of the plurality of temperatures over a logarithm of corresponding measurement times for a predetermined time window in the period of time to generate a slope and an intercept of the regression, wherein the slope and the intercept indicate a coking deposit proximal the sensor location. Additionally or alternatively, the control unit is configured, for each temperature profile, to generate a time derivative by calculating a derivative of the plurality of temperature measurements with respect to time, apply a transform to the time derivative to generate a complex spectrum, and determine an amplitude and a phase of the complex spectrum, wherein the amplitude and the phase of the complex spectrum indicate a coking deposit proximal the sensor location. The control unit can further be configured to generate a frequency derivative spectrum by calculating the derivative of the complex spectrum with respect to frequency, and determine an amplitude and a phase of the frequency derivative spectrum, wherein the amplitude and the phase of the frequency derivative spectrum indicate a coking deposit proximal the sensor location.

In certain embodiments, the control unit can further be configured to detect a misdistribution condition in the wash bed by monitoring the second temperature profile corresponding to each of the plurality of sensor locations, and compare the monitored temperature profiles to predetermined temperature profiles corresponding to a desired operation condition. Alternatively, the control unit can be further configured to detect a misdistribution condition in the wash bed by monitoring the second temperature profile corresponding to each of the plurality of sensor locations and at least a third temperature profile corresponding to each of the plurality of sensor locations, and comparing the second and third temperature profiles to detect a change in operation condition. The sensing cable can be disposed in a grid configuration within the wash bed, and the control unit can be further configured to generate a multi-dimensional flow distribution based on the first temperature profile corresponding to each sensor location.

It is to be understood that both the foregoing general description and the following detailed description are exemplary and are intended to provide further explanation of the disclosed subject matter claimed. Also, as noted, although, for simplicity purposes, the disclosures herein may be described in relation to the use in a wash bed of a vacuum pipe still, such technology as described herein will generally also be applicable in a similar manner to the installation and use in detecting localized coking, as well as flow maldistributions, in a catalytic hydroprocessing reactor catalyst bed.

The accompanying drawings, which are incorporated in and constitute part of this specification, are included to illustrate and provide a further understanding of the disclosed subject matter. Together with the description, the drawings serve to explain the principles of the disclosed subject matter.

DETAILED DESCRIPTION

Figure 1A:
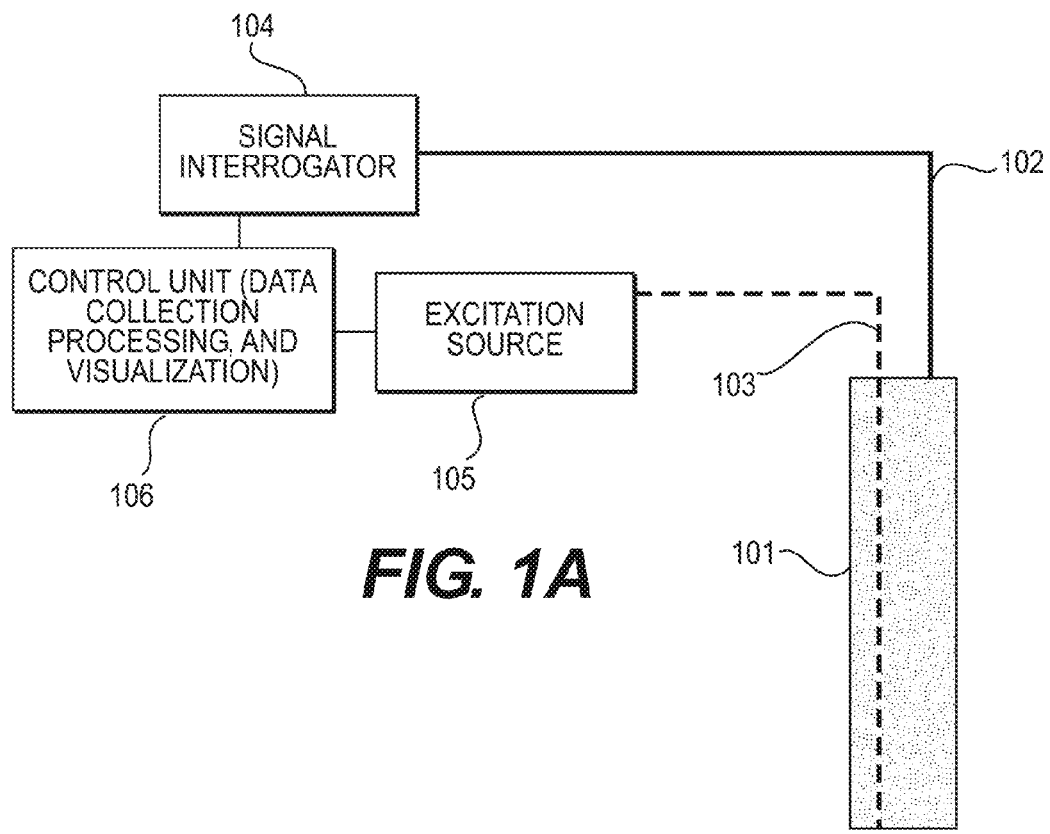
FIG. 1A is a schematic diagram of an exemplary sensing system in accordance with the disclosed subject matter.

As noted above, and in accordance with one aspect of the disclosed subject matter, methods disclosed herein include detecting coking in a wash bed of a vacuum pipe still. The method includes providing within a vacuum pipe still a sensing cable including an optical fiber sensor array aligned with a heating element and measuring a first temperature profile of the sensing cable at a plurality of sensor locations. A flow distribution of fluids within the wash bed of a vacuum pipe still is determined by identifying a first set of sensor locations of the sensing cable exposed to vapor and a second set of sensor locations of the sensing cable exposed to liquid based on the first temperature profile. The method further includes propagating at least one heat pulse through the heating element along at least a portion of the sensing cable to affect an exchange of thermal energy between the heating element and media, including the fluids, exposed to the sensing cable. At least a second temperature profile of the sensing cable corresponding to the heat pulse at each of the plurality of sensor locations on the optical fiber sensor array is measured over time. Coking is detected by determining one or more properties of the media exposed to the sensing cable at each of the plurality of sensor locations based on the second temperature profile corresponding thereto.

Furthermore, systems for detecting coking in a wash bed of a vacuum pipe still are also provided. Such systems include a sensing cable including an optical fiber sensor array aligned with a heating element disposed in the wash bed, the optical fiber sensor array having a plurality of sensor locations. The system also includes an optical signal interrogator coupled with the optical fiber sensor array and adapted to receive a signal from each of the plurality of sensor locations and configured to measure a first temperature profile of the sensing cable at the plurality of sensor locations. A control unit, coupled with the heating element and the optical signal interrogator, is configured to determine a flow distribution of fluids exposed within the vacuum pipe still by identifying a first set of sensor locations of the sensing cable exposed to vapor and a second set of sensor locations of the sensing cable exposed to liquid based on the first temperature profile. An excitation source coupled with the heating element is configured to propagate at least one heat pulse through the heating element along at least a portion of the sensing cable to affect an exchange of thermal energy between the heating element and media, including the fluids, exposed to the sensing cable. The optical signal interrogator is configured to measure, over time, a second temperature profile of the sensing cable corresponding to the heat pulse at each of the plurality of sensor locations on the optical fiber sensor array. The control unit is configured to detect coking by determining one or more properties of the media exposed to the sensing cable at each of the plurality of sensor locations based on the second temperature profile corresponding thereto.

Reference will now be made in detail to the various exemplary embodiments of the disclosed subject matter, exemplary embodiments of which are illustrated in the accompanying drawings. The accompanying figures, where like reference numerals refer to identical or functionally similar elements, serve to further illustrate various embodiments and to explain various principles and advantages all in accordance with the disclosed subject matter. The accompanying figures, where like reference numerals refer to identical or functionally similar elements, serve to further illustrate various embodiments and to explain various principles and advantages all in accordance with the disclosed subject matter. For purpose of explanation and illustration, and not limitation, exemplary embodiments of the disclosed subject matter are shown in FIGS. 1-11. Although, for simplicity purposes, the disclosures herein may be described in relation to the use in a wash bed of a vacuum pipe still, such technology as described herein will generally also be applicable in a similar manner to the installation and use in detecting localized coking, as well as flow maldistributions, in a catalytic hydroprocessing reactor catalyst bed.

In accordance with the disclosed subject matter, characteristics of one or more materials can be measured with the use of an optical fiber sensor array having a plurality of sensor locations aligned with a heating/cooling element in a sensing cable. At least one heating/cooling pulse is propagated through the heating/cooling element along at least a portion of the sensing cable to affect an exchange of thermal energy between the heating/cooling element and one or more media exposed to the sensing cable. A temperature profile of the sensing cable (e.g., in the time domain and/or spatial domain) corresponding to the heating/cooling pulse at the plurality of sensor locations on the optical fiber sensor array can be measured to support a variety of techniques in accordance with the disclosed subject matter.

Generally, for purpose of illustration and not limitation, thermal properties, such as material density, thermal conductivity, heat capacity, or heat diffusion coefficient, of one or more materials can be measured by generating a heat disturbance and sensing a temperature response. In like fashion, dynamic physical properties, such as the flow of a material, can also be measured. As disclosed herein, techniques for measuring temperature can include obtaining temperature measurements in both the temporal and spatial domain. For example, distributed temperature sensing (DTS) systems can provide temperature measurements along the length of a sensing cable continuously or at regular intervals. The change in these temperature measurements can correspond to certain properties of a surrounding material or materials.

For purpose of illustration, and not limitation, an exemplary system for measuring the characteristics of a material in accordance with an exemplary embodiment of the disclosed subject matter will be described. In general, with reference to FIG. 1A, an exemplary sensing system in accordance with the disclosed subject matter can include a sensing cable 101 having disposed therein a heating/cooling device 103 and optical fiber sensor array having a plurality of sensors 102. The sensing cable 101 can be operatively coupled with a control unit 106. For example, the heating/cooling device 103 can be coupled with an excitation source 105, which in turn can be coupled with the control unit 106. Likewise, the optical fiber sensor array 102 can be coupled with a signal interrogator 104, which can be coupled with the control unit 106. Generally, uniform heat can be delivered (e.g., heat energy can be provided or absorbed) along the sensing cable 101 via the heating/cooling device 103 and the excitation source 105. A temperature profile or its variation with time (e.g., variation rate) can be measured using the optical fiber sensor array 102 and signal interrogator 104. The control unit 106 can be adapted to collect data, process data, and/or present data for visualization, for example via one or more displays (not shown).

The sensing cable 101 can be arranged in a variety of configurations. Two exemplary configurations are depicted in FIG. 1B and FIG. 1C, respectively. For example, FIG. 1B depicts a cross section of a sensing cable 101 with the heating/cooling device 103 and the optical fiber sensor array 102 arranged in parallel with each other. The sensing cable 101 can include, for example, an outer casing (not shown) optionally filled with a filler material 110 to maintain the heating/cooling device 103 and optical fiber sensor array 102 in place. Additionally or alternatively, the filler can be extended about the heating/cooling device 103 and temperature sensor 102 with or without the outer casing. The filler can be, for example, a material with high thermal conductivity, such as magnesium oxide (MgO). The outer casing can be a rigid and/or durable material, for example a metal tube. To ensure measurement accuracy, e.g., under harsh conditions, such as corrosion, the sensing cable 101 casing can be treated with a suitable coating, as described in more detail below. Alternatively, and as depicted in cross section in FIG. 1C, the heating/cooling device 103 and the temperature sensor array 102 can be generally coaxial with each other, wherein the heating/cooling device 103 is disposed concentrically around the temperature sensor array 102.

As embodied herein, the sensing cable 101 can be mineral insulated for protection of a optical fiber sensor array 102 including one or more optical fibers. The optical fibers can be coated and placed into a protective tube structure for enhanced mechanical integrity and resistance to adversary effects of environmental factors, such as $H_2$, $H_2S$ and moisture. The sensing cable 101 can further be protected using metal and mineral insulation material (e.g., MgO) for effective thermal conduction. The optical fibers can have a relatively small diameter, and thus can be placed into a protective tube with a relatively small diameter, allowing a faster thermal response and dynamic process monitoring. One of ordinary skill in the art will appreciate that the dimensions of the sensing cable 101 can be selected for a desired application. For example, if further protection from the local environment is desired, a sensing cable 101 with a larger diameter, and thus additional filler, can be selected.

Furthermore, a number of commercially available fibers for the temperature sensor 102 can be used, such as a Fiber Bragg Grating array, Raman scattering based sensor, Rayleigh scattering based sensor or Brillouin scattering based sensor. One of ordinary skill in the art will appreciate that each type of fiber sensor can have certain properties, such as response time, sensing resolution, immunity to hydrogen darkening, effective sensing cable length, and ability to sense temperature and/or strain, as illustrated for purpose of example and not limitation in Table 1. For example, a Fiber Bragg grating sensing system can include a relatively fast response time, high spatial resolution, and can be employed over a sensing cable length upwards of 100 km or longer in connection with the use of optical fiber amplifiers. Raman and Brillouin scattering sensing systems can have relatively low response times (e.g., on the order of several seconds), and spatial resolution on the order of centimeters. Rayleigh scattering sensing systems, when operated to sense temperature, can have a response time of several seconds with relatively high spatial resolution.

TABLE 1

| Sensor types | Fastest response time | Typical point sensor size (m) | Immunity to H2 darkening | Longest sensor cable length |
|---|---|---|---|---|
| Fiber Bragg Grating (FBG) | <10 ms | 0.01 | high | <100 km or longer |

TABLE 1-continued

| Sensor types | Fastest response time | Typical point sensor size (m) | Immunity to H2 darkening | Longest sensor cable length |
|---|---|---|---|---|
| Raman scattering sensor | >Several seconds | 0.25~0.5 | low | <100 km |
| Rayleigh scattering sensor (Temp) | >Several seconds | 0.01 | low | <70 m |
| Rayleigh scattering sensor (Acoustic) | <1 ms | 0.5 | low | <100 km |
| Brillouin scattering sensor | >Several seconds | 0.1~50 | low | <100 km |

One of ordinary skill in the art will also appreciate that certain of the various types of sensing systems can be used to sense temperature and/or strain (e.g., to sense acoustics). For example, Fiber Bragg Grating sensing systems can be used to measure both temperature and strain, for purposes of sensing temperature and acoustics. Raman scattering sensing systems are typically used to sense temperature. Brillouin scattering sensing systems can be used to measure temperature and strain, and are typically used to sense temperature. Rayleigh scattering sensing systems can be used to measure temperature and strain, and can be used to sense either temperature or acoustics. One of ordinary skill in the art will appreciate that when Rayleigh scattering sensing systems are used to sense acoustics, response time can increase to lower than 1 ms and spatial resolution can increase to approximately 50 cm.

Referring again to FIG. 1A, and as noted above, the control unit 106 can be coupled with the signal interrogator 104. The signal interrogator 104 can be, for example, an optical signal interrogator. Various optical signal interrogators may be used, depending on the type of optical fiber sensing techniques to be employed. The controller 106 can be adapted to perform signal processing on real-time temperature data provided by the signal interrogator 104. For example, the control unit 106 can be adapted to identify and record continuous or repeated temperature measurements at each of a plurality of sensor locations along the sensing cable 101. Additionally, the control unit 106 can be adapted to process temperature measurements over time to identify a characteristic of the material surrounding the sensing cable at one or more sensor locations.

As disclosed herein, a variety of suitable methods can be employed for generating the heating/cooling pulse along the sensing cable 101. As used herein, the term "pulse" includes a waveform of suitable shape, duration, periodicity, and/or phase for the intended purpose. For example, and not limitation, and as described further below, the pulse may have a greater duration for one intended use, such as the determination of deposits, and a shorter duration for another intended use, such as the determination of flow. As embodied herein, the heating/cooling device 103 can be an electrically actuated device. For example, the heating/cooling device 103 can include a resistive heating wire, and the excitation source 105 can be electrically coupled with the heating wire and adapted to provide a current there through. Passing of a current through the resistive heating wire can provide thermal energy along the length of the sensing cable 101, thereby generating a uniform heating/cooling effect along the sensing cable. Alternatively, the heating/cooling device 103 can include a thermoelectric device, and can be likewise coupled to the excitation source 105. The thermoelectric device can use the Peltier effect to heat or cool a surrounding medium. That is, for example, the thermoelectric device can be a solid-state heat pump that transfers heat from one side of the device to the other. The thermoelectric device can be configured, for example, to provide heating to the optical fiber sensor for a certain polarity of electric potential and cooling for the opposite polarity. As disclosed herein, and for purpose of simplicity, the terms "heating/cooling device", and "heating/cooling pulse" will be referred to generally as a "heating device" or "heating element" and as a "heat pulse," respectively. Depending upon the context, such terms are therefore understood to provide heating, cooling, or both heating and cooling.

In an exemplary embodiment of the disclosed subject matter, the excitation source 105 can be configured to deliver current in a predetermined manner. For example, the excitation source 105 can be configured to generate pulses having predetermined wave forms, such as square waves, sinusoidal waves, or saw tooth waves. The excitation source 105 can be configured to generate the pulses at a predetermined frequency. For example, and not limitation, and with reference to FIG. 2, the excitation source 105 can be configured to generate an electric pulse of a rectangular wave form 210 through the heating/cooling element 103. The electric pulse can create a heat pulse 220 in the heating/cooling element 103 with the same wave form. That is, for example, the heat flow through the heating/cooling element 103 can be given by $I^2 R/A$, where I is the current, R is the resistance of the heating/cooling element 103, and A is the surface area of a cross section of the heating/cooling element 103. The heat pulse can result in a heat exchange between the sensing cable 101 and the surrounding media. The temperature at each sensor location can be recorded to generate a "temperature profile" 230 for each sensor location. For example, the temperature at each sensor location can be recorded with a sampling frequency of 50 Hz. The temperature profile 230 can correspond to characteristics of the medium surrounding the sensing cable 101 at each sensor location.

For purposes of illustration, and not limitation, the underlying principles of thermally activated ("TA") measurement techniques will be described generally. Prior to heating or cooling by the heating/cooling device 103, temperature measurements of the surrounding medium can be taken with the optical fiber sensor array 102 of the sensing cable 101 and the temperature profile can be recorded as a reference. Due to the Joule effect, the heating device 103 can deliver a constant and uniform heat along the cable, heating up both cable and surrounding medium near the cable surface. For purposes of illustration, the temperature measured by the optical fiber can be described by the following equation:

$$\frac{\partial T}{\partial t} = \frac{1}{mc_p}(\dot{E}_{gen} - \dot{E}_{loss}), \quad (1)$$

where $\dot{E}_{gen}$ is the heat generation rate per unit length from the heating device, $\dot{E}_{loss}$ is the heat loss rate due to heat transfer from the sensing cable to the surrounding medium, and m and $c_p$ represent the mass and heat capacitance of the sensing cable per unit length. The heat generation within the sensing cable due to the Joule effect can be given by:

$$\dot{E}_{gen} \propto Zi^2 \quad (2)$$

where Z is the impedance of the sensing cable per unit length and the rate of heat loss from the sensing cable to the surrounding media can be decomposed into heat diffusion and heat convection (e.g., $\dot{E}_{loss}$ can include both heat diffusion (conduction) in a stationary medium and or convective heat transfer in a flowing medium):

$$\dot{E}_{loss} = \dot{E}_{diffusion} + \dot{E}_{convection} \quad (3)$$

For a stationary medium, the heat loss term can be given as:

$$\dot{E}_{loss} \propto Ak\Delta T, \quad (4)$$

where A is effective heat transfer area of the sensing cable, k is effective heat conduction coefficient of the medium and $\Delta T$ is the effective temperature gradient across the sensing cable and the medium.

The heat capacitance of the cable per unit length can limit the frequency of the thermal response of the cable, and thus the cable can be designed with a heat capacitance suited to the desired data frequency. Because heat generation can be relatively constant and uniform, the rate of change in localized temperature can depend primarily on the heat transfer between the cable and the surrounding medium. If the localized heat transfer is high at a particular point on the sensing cable, then the rate of change of temperature at that point along the cable, measured by one temperature sensor in the optical fiber, can be small. Otherwise, the temperature changing rate will be large. When subject to a heterogeneous medium or a mixed medium consisting of layers of different fluids or the like, the spatial distribution of the temperature along the sensor array can be indicative of the interface between the different media.

For purpose of illustration, and not limitation, transient temperature analysis techniques to determine characteristics of a medium will now be described with the sensing cable modeled as an infinitely long thin cylinder placed in an infinite homogeneous medium. For purposes of this description, it is assumed that at time zero (t=0) an electrical current, i, and the heat generation rate per length of the cylinder is given by:

$$q = \pi r_0^2 z_0 i^2, \quad (5)$$

where $r_0$ is the radius of the cylinder, and $z_0$ is the resistance of the cylinder per unit of volume. A closed form solution for the temperature on the surface of the cylinder can be given as:

$$T(r_0, t) - T_\infty = \frac{q}{4\pi k} \int_{\frac{r_0^2}{4\alpha t}}^{\infty} \frac{e^{-u}}{u} du, \quad (6)$$

where k and $\alpha$ are the heat conductivity and diffusivity coefficients of the medium, and $T_\infty$ is the initial temperature distribution along the sensing cable. The normalized temperature change and normalized time t can be defined as:

$$\Delta T^* = \frac{T(r_0, t) - T_\infty}{q/(4\pi k)} \quad (7)$$

and $$t^* = \frac{4\alpha t}{r_0^2}. \quad (8)$$

Equation 6 can thus be given as:

$$\Delta T^* = \int_{1/t^*}^{\infty} \frac{e^{-u}}{u} du. \quad (9)$$

The incomplete gamma function can have following expansion form for small but non-zero value of z (0<z<2.5):

$$\Gamma(z) = \int_z^\infty \frac{e^{-u}}{u} du = -\gamma - \ln(z) - \sum_{n=1}^{\infty} \frac{(-z)^n}{n(n!)}. \quad (10)$$

The temperature response as given by equation 6 above can be further approximated as $$\Delta T^* \approx -\gamma - \ln(1/t^*), \quad (11)$$

when $$z = 1/t^* \ll 1. \quad (12)$$

In accordance with this illustrative and non-limiting model, comparison of the normalized temperature change as a function of normalized time (e.g., as given by equation 9 and equation 11, respectively) indicates that when the normalized time is greater than approximately 10, equation 11 is a good approximation of normalized temperature change. Moreover, equation 11 above indicates that temperature change can increase linearly with the log of time when the heating time is sufficiently large so as to satisfy the criteria in equation 12. Thus, the equation can be written as:

$$\Delta T(r_0, t) \approx a + b \ln(t), \quad (13)$$

where parameters a and b are function of thermal properties of the medium for given heating rate, and are given by:

$$a = \frac{q}{4\pi k}\left(-\gamma - \ln\left(\frac{r_0^2}{4\alpha}\right)\right) \quad (14)$$

and $$b = \frac{q}{4\pi k}. \quad (15)$$

Thus, equation 13 can provide a theoretical basis for determining the thermal properties of a medium based on measurement of transient temperature. One of ordinary skill in the art will appreciate that continuous heating can consume more electrical energy and make measurements less sensitive to dynamic change of the thermal properties to be measured (e.g., when the medium mixture changes with time), and thus pulsed heating in accordance with the disclosed subject matter can provide benefits such as decreased electrical energy usage and for measurement of dynamic conditions of surrounding materials.

For purpose of illustration, and not limitation, an exemplary method of measuring the characteristics of the media surrounding the sensing cable using thermal analysis sensing techniques will be described. In general, an optimized waveform of electrical pulse (for example, a square wave) can be delivered along the length of the heating/cooling device 103, and temperature can be monitored using a temperature sensor array 102, e.g., optical fiber sensors. Owing to the uniformity of the heating/cooling effect along the sensing cable, temperature readings can vary depending on localized heat transfer process, which can be a function of the thermal properties (e.g., thermal conductivity, heat capacity) and physical conditions (static or flow) of the medium surrounding the sensing cable 101. The control unit 106 can be adapted to determine the characteristics of the surrounding media simultaneously, using the temperature profile.

A single heating pulse (e.g., arising from an optimized waveform of electrical pulse) can create a temperature response which can be derived in accordance with the exemplary and non-limiting model described herein using superposition as follows:

$$T(r_0, t) - T_\infty = \frac{q}{4\pi k}\left(\int_{\frac{r_0^2}{4\alpha t}}^{\infty} \frac{e^{-u}}{u} du - \int_{\frac{r_0^2}{4\alpha(t-t_0)}}^{\infty} \frac{e^{-u}}{u} du\right). \quad (16)$$

The first term in the bracket of equation 16 can represent the heating from t to $t_0$, and the 2nd term the cooling after $t_0$. Data collected during heating and cooling are analyzed separately, as disclosed herein, to derivate estimates of thermal properties of the medium.

Based upon the above, the control unit 106 can be adapted to determine the characteristics of the surrounding media using a variety of suitable techniques. For example, the temperature profile at each sensor location can be used to determine the characteristics of the surrounding media directly. The temperature measurements during heating and/or cooling of the sensing cable, corresponding to the timing of the rectangular electrical pulse, can be used to generate a feature-temperature profile at each sensor location. For example, the feature-temperature profiles can be extracted from the temperature data at distinctive conditions: heating (e.g., the condition during which the heat pulse is passing over a sensor location), cooling (e.g., the condition during which the heat pulse has passed over the sensor location and heat is being exchanged between the sensing cable and the surrounding media) and peak temperature (e.g., approximately the maximum temperature recorded at the sensor location for each heat pulse).

Figure 3:
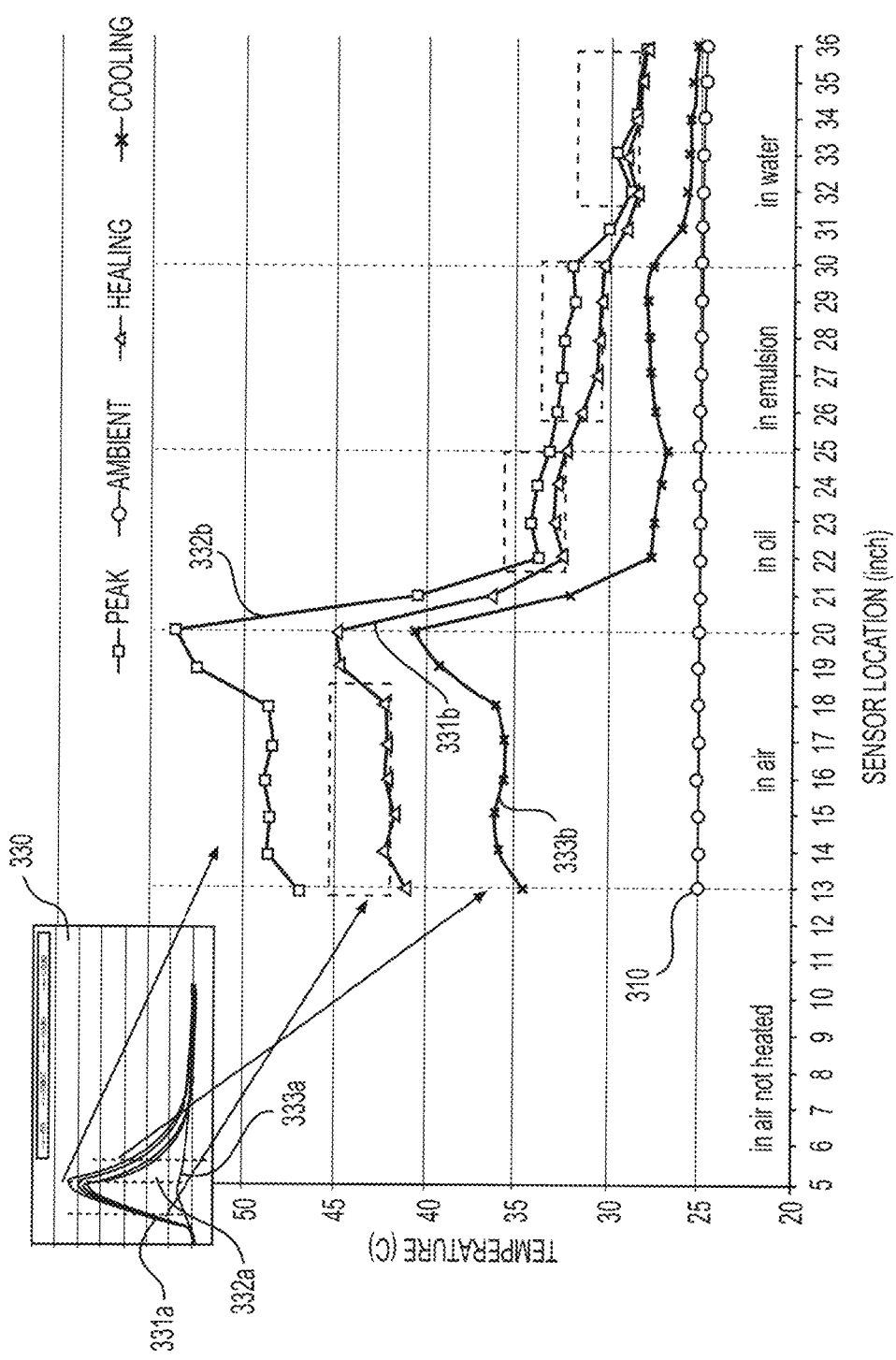
FIG. 3 is a graph illustrating a direct temperature sensing technique for a plurality of sensor locations in accordance with the disclosed subject matter.

For purpose of illustration, and not limitation, and with reference to FIG. 3, the control unit 106 can be configured to determine temperature characteristics of surrounding media using the feature-temperature profile at each sensor location. FIG. 3 shows distribution of feature temperatures along a sensing cable exposed to different media at different sensor locations. Graph 330 depicts the measured temperature profiles for a plurality of sensor locations. In accordance with the disclosed subject matter, feature-temperatures 331b, 332b, and 333b can be extracted from the measured temperature profile depicted in graph 330. For example, at each sensor location, feature-temperature 331b can correspond to a heating condition (e.g., while the heat pulse is passing over the sensor location), and can be extracted for each sensor location at a corresponding time 331a. Likewise, feature-temperature 332b can correspond to a peak temperature, and can be extracted for each sensor location at a corresponding time 332a. Similarly, feature temperature 333b can correspond to a cooling condition (e.g., after the heat pulse has passed over the sensor location and during which heat exchange between the cable and the surrounding media takes place) and can be extracted for each sensor location at a corresponding time 333a. Temperature 310 is the measured temperature at each sensor location during ambient conditions (e.g., no heat is applied).

As illustrated by FIG. 3, the feature temperature at each sensor location can correspond to the temperature characteristics of the surrounding media. For example, as depicted in FIG. 3, a 36 inch sensing cable arranged in a vertical configuration with a sensor disposed or located each unit inch along the cable can be exposed to a stack of air, oil, emulsion, and water. It should be noted that FIG. 3 depicts data from 24 sensor locations. Assuming each medium is stationary around the sensing cable, the rate of heat exchange, and thus the feature-temperature profiles 331b, 332b, and 333b, between the sensing cable and the surrounding media at each sensor location can correspond to the heat conduction of the surrounding media. That is, for example, heat transfer between the sensing cable and surrounding air can be lower than that between the sensing cable and water, as water has a higher heat conduction. Oil and emulsion layers can also be identified in this manner.

The determination of the characteristics of the media surrounding the sensing cable can be achieved by further configuring the control unit 106 to process the temperature profile. For example, in accordance with an exemplary embodiment of the disclosed subject matter, the regression of the temperature over log of time can be performed over an interval of time corresponding to each heat pulse for each sensor location. The slope and intercept of the regression can be used to identify the material characteristics. For example, the regression can take the functional form of T=b+m ln(t), where T is the temperature measurement, ln(t) is the natural log of the time of the temperature measurement, b is the intercept of the regression, and m is the regression coefficient.

The interval over which the regression is taken can be, for example, during the heating condition described above (e.g., during which the heat pulse passes over the sensor location). Because heating can occur in a logarithmic manner, taking the regression as a function of the log of time and provide for results with lower error (e.g., a higher correlation coefficient). That is, for example, the temperature as a function of the log of time can be substantially linear over the heating period. Alternatively, the interval over which the regression is taken can be during the cooling condition described above. For purpose of illustration, and not limitation, for a square electrical pulse from 0 current to a constant non-zero value, the constant non-zero current value can correspond to the heating stage, and zero current can correspond to the cooling stage. The slope of the regression for the heating stage can be computed over a fraction of pulse duration when the current is non-zero, while slope of the regression for the cooling stage can be computed over a fraction of the time for which the current changes to zero value. Additionally or alternatively, the regression can take a number of suitable functional forms. For example, an nth order polynomial regression can be taken if the functional form of the temperature profile resembles an nth order polynomial.

Figure 4A:
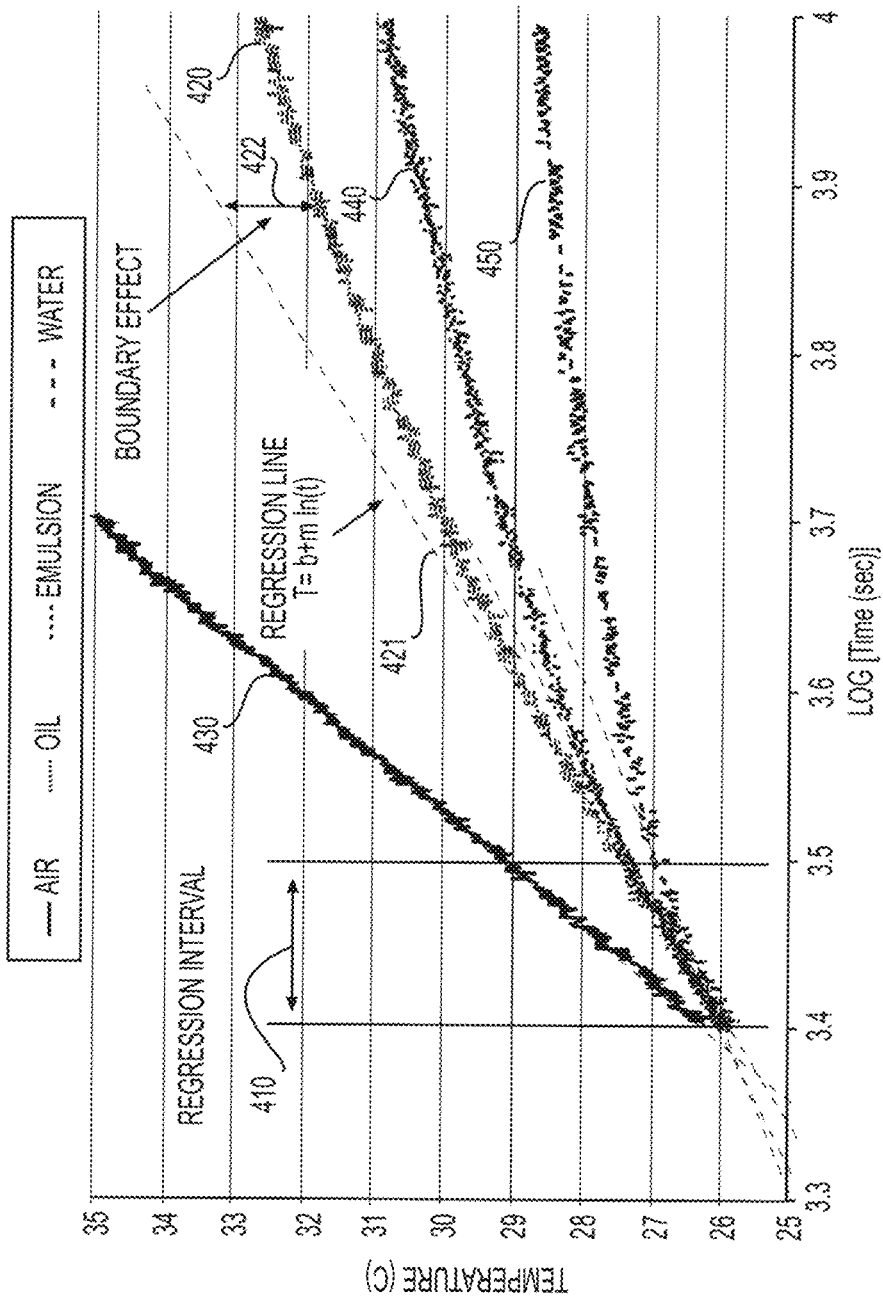
FIG. 4A is a graph illustrating log-time regression sensing technique in accordance with the disclosed subject matter.

For purpose of illustration, FIG. 4A shows the regression results of one temperature measurement at a sensor location in each material of FIG. 3. Line 420 corresponds to a plot of temperature at a sensor location in oil over the log of time. Likewise, lines 430, 440 and 450 correspond to a plot of temperature at a sensor location in air, emulsion, and water, respectively, over the log of time. Regression can be performed over a regression interval 410, which can correspond to the heating condition of the respective temperature sensor. The results of the regression can be plotted. For example, line 421 is a plot of the regression of line 420. As illustrated by FIG. 4A, the slope and intercept of each regression can correspond to a characteristic of the surrounding material, and such characteristics can be determined. That is, with reference to FIG. 4A, each material having different thermal characteristics can have a different slope and intercept, and can thus be identified. As depicted in FIG. 4A, the deviations in measurements resulting from the linear fitting line after the regression interval, as shown by line 420 and line 421, can be due to boundary effects from the wall of the vessel.

One of ordinary skill in the art will appreciate that the description of the underlying principles herein assumes the thermal energy delivered by the sensing cable diffuses out without any boundaries. However, in the presence of such boundaries, thermal energy will be contained in a finite space and eventually thermal equilibrium will be reached. Accordingly, the regression interval can be selected based on a desired application, including corresponding boundary conditions.

Figure 4B:
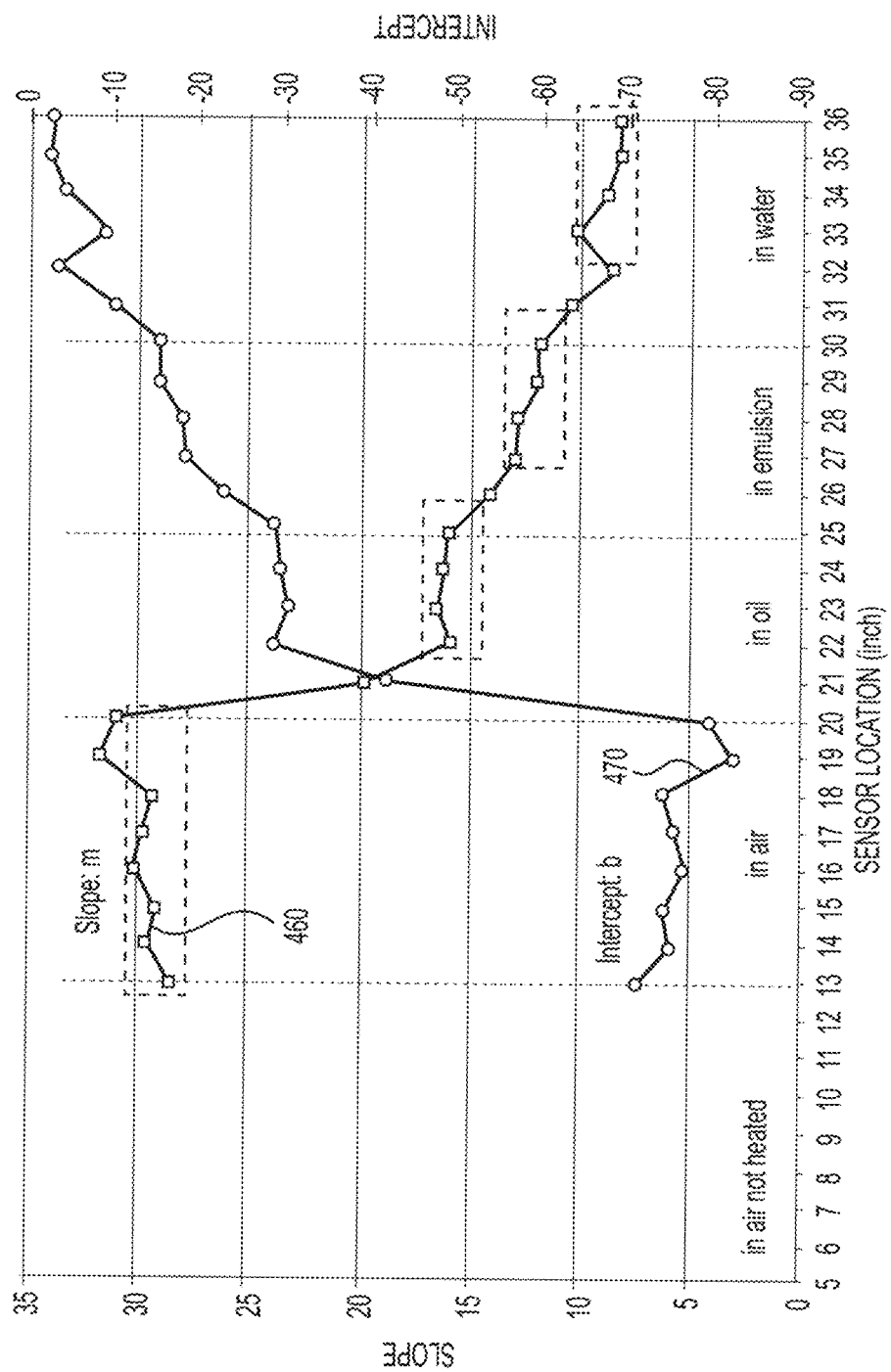
FIG. 4B is a graph illustrating log-time regression sensing technique for a plurality of sensor locations in accordance with the disclosed subject matter.

For purpose of illustration, FIG. 4B shows the regression results for 24 temperature sensors of FIG. 3, showing both slopes 450 and intercepts 470. As illustrated by FIG. 4A and FIG. 4B, in certain circumstances these techniques can provide determination of material characteristics with reduced error, comparing results from FIG. 4B with FIG. 3 to differentiate the emulsion layer and the oil layer. The interval over which the regression can be performed can be predetermined to reduce boundary effect errors (e.g., error 422 induced by boundary effects in the plot of line 420). That is, for example, taking the regression over a small interval can omit certain features of a temperature profile that can correspond to a particular characteristic. Accordingly, the regression interval can be predetermined such that errors induced by boundary effects are reduced. For example, the regression interval can be predetermined by calibration and/or with reference to known parameters or operating conditions of the system, such as expected features of a temperature profile.

In accordance with another aspect of the disclosed subject matter, enhanced determination of the characteristics of media surrounding the sensing cable can be achieved with a control unit 106 configured to process the temperature profile in the frequency domain. A N-pulse train (i.e., application of a certain periodic form of current through the sensing cable to generate N cycles of heating and cooling) can be propagated through the heating/cooling element 103. The period of a heating/cooling cycle, $t_0$, the number of heating cycles, N, and the current amplitude, $I_0$, can be selected. The heating/cooling pulses can be applied to the heating/cooling element 103 with the excitation source 105 to generate thermal excitation within the sensing cable 101.

Temperature readings from the optical fiber sensor array 102 can be collected via the signal interrogator 104 at a selected sampling frequency. The sampling frequency can be, for example, at least twice the maximum signal frequency of interest. A temperature series, $T_i(1)$, $T_i(2)$, $T_i(3)$, ... can be generated where i=1, 2, 3 . . . . M, is the sensor index. In accordance with certain embodiments, synchronized sampling techniques can be employed to reduce the sample number, increase the signal to noise ratio, and improve Fourier transform accuracy. The time difference of the temperature readings $\Delta T=[T(k+1)-T(k)]/\Delta t$, can be calculated using the control unit 106 to generate time series of temperature derivative $\Delta T_i(1)$, $\Delta T_i(2)$. $\Delta T_i(3)$ ..., where sensor index i=1, 2, 3 ... M. In connection with the following description, the temperature difference, differenced temperature, or temperature derivatives are all referred to as the time series $\Delta T$. A transform (e.g., a Fast Fourier Transform [FFT], or Discrete Fourier Transform [DFT]) can be applied, using the control unit 106, to generate a spectrum of time series of temperature difference for M sensors. For each sensor, the real and imaginary values of the spectrum at fundamental frequency of N-Pulse train can be selected $f_0=1/t_0$. The characteristics of the surrounding media can thus be determined as disclosed herein using M pairs of the values derived from the spectrum of the temperature difference as described above. Alternatively, the frequency differenced spectrum (i.e., obtained by applying the operation of taking the derivative of the spectrum of temperature difference with respect to the frequency) and the real and imaginary values of the differenced spectrum can be used. The characteristics of the surrounding media can thus be determined as disclosed herein using M pairs of the values derived from the differenced spectrum as described above.

Figure 5A:
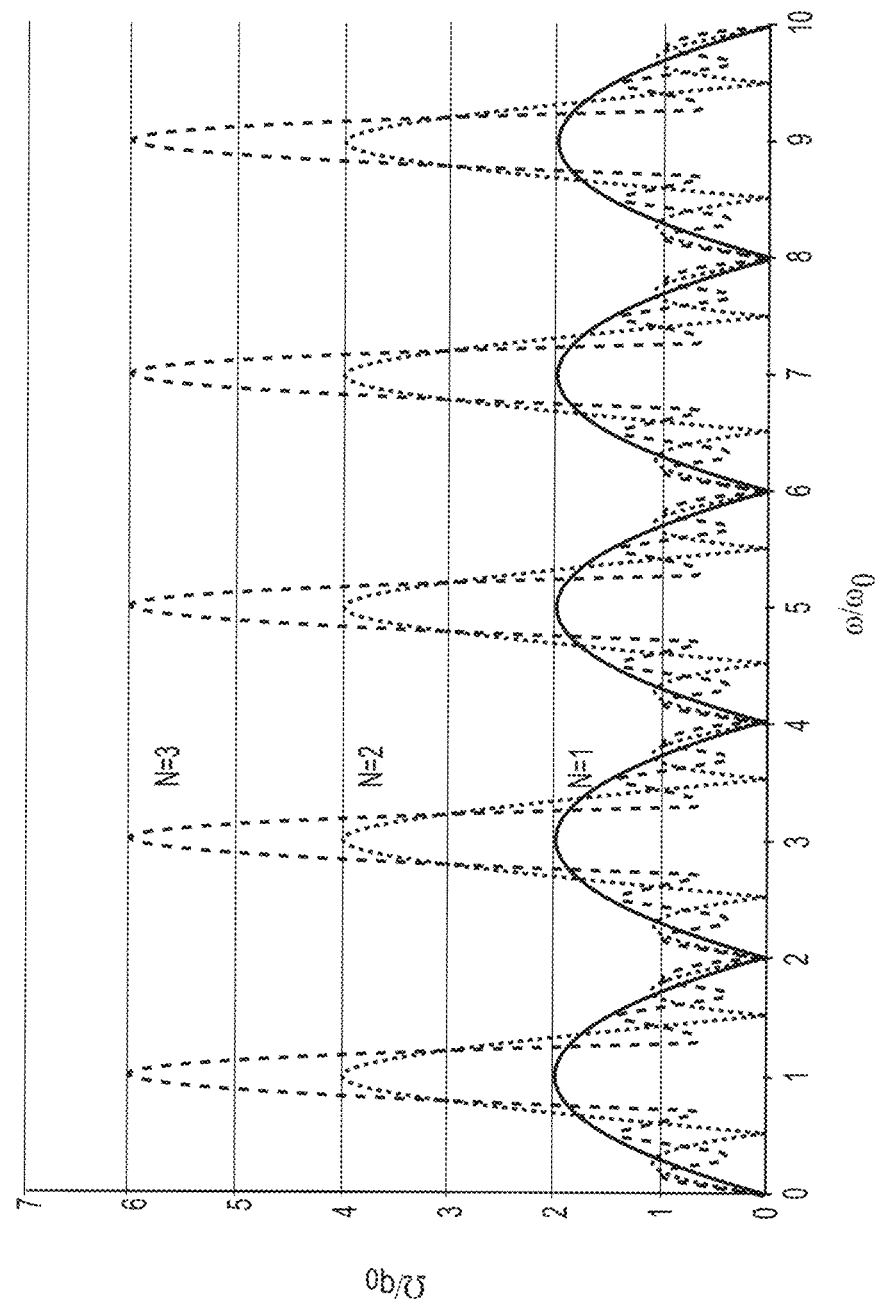
FIG. 5A is a graph illustrating thermal excitation energy concentration at harmonics and fundamental frequencies of heat pulses in connection with a frequency spectrum sensing technique.
Figure 5B:
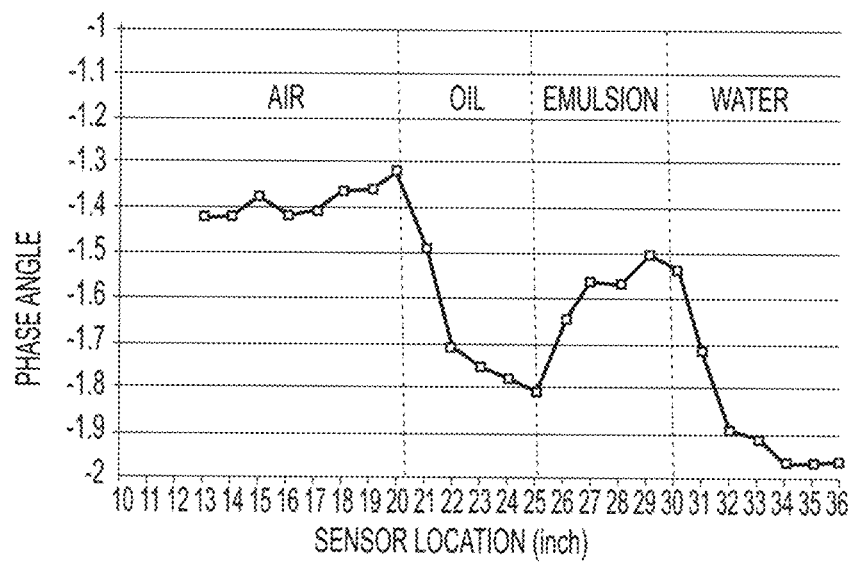
FIG. 5B is a graph illustrating the phase of a frequency-derivative spectrum in connection with frequency spectrum sensing techniques over a plurality of sensor locations in accordance with the disclosed subject matter.
Figure 5C:
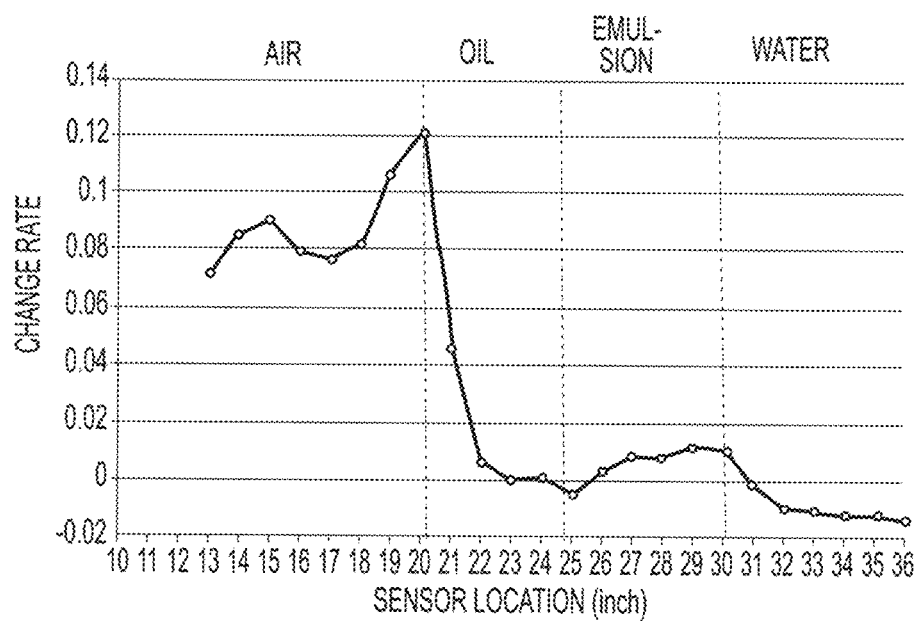
FIG. 5C is a graph illustrating the amplitude of a frequency-derivative spectrum in connection with frequency spectrum sensing techniques over a plurality of sensor locations in accordance with the disclosed subject matter.

That is, for example, the time derivative of the temperature data can be determined (i.e., resulting in the differenced temperature). The Fourier transform of the time-derivative temperature can then be determined, and the derivative of the complex spectrum with respect to the frequency can be calculated (i.e., resulting in the differenced spectrum). The amplitude and phase of the frequency-derivative spectrum (differenced spectrum) can then be calculated. The amplitude and phase of the frequency-derivative spectrum can correspond to the characteristics of the surrounding media at each sensor location. For purpose of illustration, FIG. 5B shows the phase of the frequency-derivative spectrum of the temperature measurements over the sensor locations as illustrated in FIG. 3. Likewise, FIG. 5C shows the amplitude of the frequency-derivative spectrum of the temperature measurements over the sensor locations as illustrated in FIG. 3. As illustrated by the figures, the techniques disclosed herein can provide for enhanced accuracy in the measurement and differentiation of the levels and interfaces between the air, oil, emulsion, and water layers.

As embodied herein, the sensing cable 101 can be calibrated, e.g., with the control unit 106. Calibration can include calibrating the sensor array to ensure that each sensor at a different location along the sensing cable provides the same output when subject to the same material of a constant thermal property. For example, the sensing cable 101 can be submerged into a homogenous medium of known thermal property, and the temperature measurements and processing techniques disclosed herein can be applied. If there is a difference between sensor output, the difference can be used as compensation and can be applied during measurements. Additionally, calibration can include ensuring that the sensor output accurately estimates the particular characteristic of interest (e.g., thermal conductivity and/or diffusivity). For example, a number of materials with known thermal properties can be measured for a broad range of values and a database can be constructed including correlations between measurements and determined characteristics of the known materials. The database can then be used to interpolate a measured characteristic of an unknown material.

Figure 2:
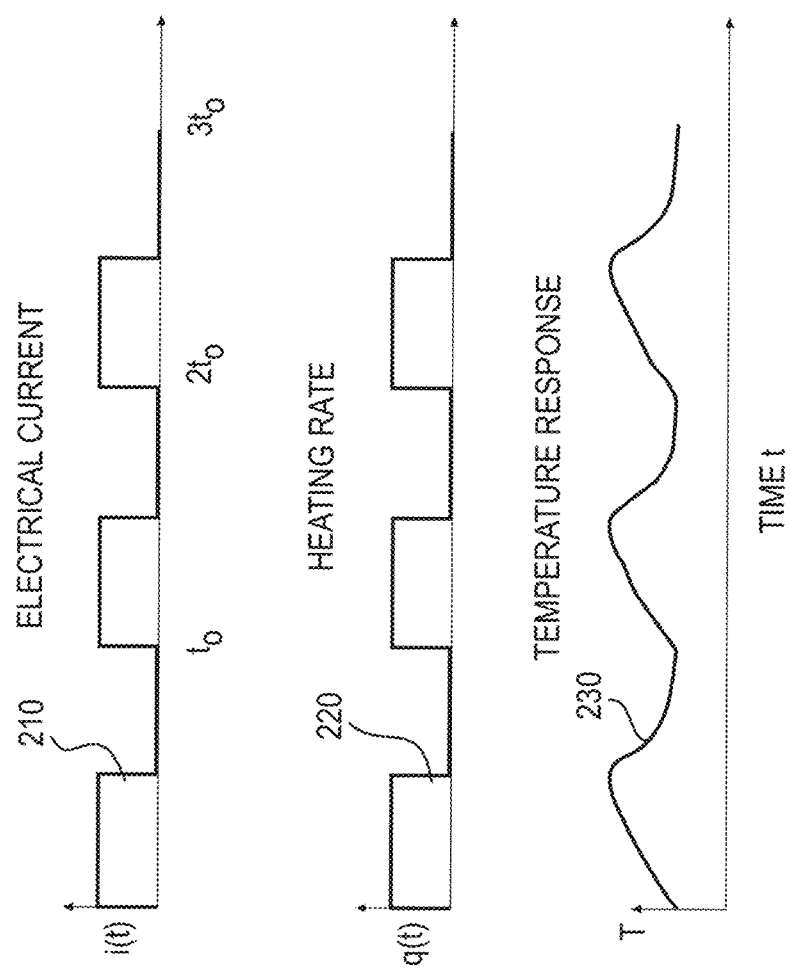
FIG. 2 depicts a representative plot of current and heat pulses and corresponding temperature response in accordance with the disclosed subject matter.

For purpose of illustration, and not limitation, the underlying theory of measurement techniques in accordance with this exemplary embodiment will be described. In connection with this description, for purpose of example, the waveform of the pulse train propagated through the heating device can be a square shape current, e.g., as illustrated in FIG. 2. The current can be defined mathematically as:

$$i(t) = \sum_{n=1}^{N} \left\{ H(t-(n-1)t_0) - H\left(t-\left(n-\frac{1}{2}\right)t_0\right) \right\} I_0, \quad (17)$$

where $t_0$ is the period, $I_0$ is the amplitude of the current, and H denotes the Heaviside step function defined by:

$$H(x - x_0) = \begin{cases} 0 & x < x_0 \\ 1 & x \geq x_0 \end{cases}. \tag{18}$$

The heating rate can thus be given as:

$$q(t) = \sum_{n=1}^{N} \left\{ H(t - (n-1)t_0) - H\left(t - \left(n - \frac{1}{2}\right)t_0\right) \right\} q_0, \tag{19}$$

where $q_0$ is related to the current by equation 5.

Instead of analyzing the temperature in time domain, the temperature rate, i.e., the derivative of the temperature with respect to time, can be considered in the frequency domain. The derivative operation, a high-pass filtering, can remove the slow-varying trend of the temperature for easier analysis. The time derivative of the temperature and heating generation rate can be defined as follows:

$$\dot{T}(r, t) = \frac{dT}{dt} \tag{20}$$

and $$\dot{q}(t) = \frac{dq}{dt}. \tag{21}$$

In frequency domain, the counterparts to the temperature and heating generation rate can be complex spectrum functions of $S(r, \omega)$ and $\Omega(\omega)$. For large distances away from the heating element, the thermal diffusion process can exhibit the behavior of an attenuated and dispersive wave. The complex spectrum of the change rate of the temperature on the sensing cable's surface can be given as:

$$S(r_0, \omega) = \frac{1}{2\pi k} \frac{\Omega(\omega)}{\kappa r_0} \frac{H_0^{(2)}(\kappa r_0)}{H_1^{(2)}(\kappa r_0)}. \tag{22}$$

The contribution of the heating component, $\Omega$ at a center frequency of $\omega$, to the change rate of the temperature on the sensing cable's surface can thus be given as:

$$d\dot{T}(r_0, \omega, t) = S(r_0, \omega) e^{j\omega t} d\omega. \tag{23}$$

Integration of above over all frequencies can recover the temperature rate in time domain. Therefore, S can be used as indicator of the medium. For purpose of illustration, and not limitation, the excitation term, $\Omega$ will now be described in greater detail. From equations 19 and 21, the derivative of the heating generation can be given as:

$$\dot{q}(t) = \sum_{n=1}^{N} \left\{ \delta(t - (i-1)t_0) - \delta\left(t - \left(i - \frac{1}{2}\right)t_0\right) \right\} q_0 \tag{24}$$

in time domain, and:

$$\Omega(\omega) = q_0 \left( e^{j\omega t_0} - e^{j\frac{\omega t_0}{2}} \right) \sum_{n=1}^{N} e^{j(n\omega t_0)} \tag{25}$$

in frequency domain. Because N is finite, $\Omega$ can contain all frequencies. The components at the harmonic frequencies can be given as:

$$\omega_k = k\omega_0 \tag{26}$$

$$= k\frac{2\pi}{t_0},$$

with index k.

Evaluation of equation 25 at the harmonic frequencies gives:

$$\Omega(\omega_k) = \begin{cases} 2Nq_0 & k = 1, 3, 5 \ldots \\ 0 & k = 0, 2, 4 \ldots \end{cases}. \tag{27}$$

As such, $\Omega$ peaks at odd harmonics but zeros at even harmonics. At non-harmonic frequencies, $\Omega$ is complex in general. FIG. 5A depicts an exemplary plot of $\Omega/q_0$ verse $\omega/\omega_0$) for N=1, 2, or 3. Accordingly, the thermal excitation energy can be concentrated at odd harmonics of fundamental frequency of pulses and increase as N increases.

As embodied herein, one of the odd harmonic frequencies can be chosen to increase signal to noise ratio in analysis of temperature measurements. In this manner, any temperature variation introduced by non-electrical heating can introduce noise which could be difficult to handle in time domain but can be reduced in frequency domain via N-pulse train: the number of cycles, N, can be increased to boost the peak value at odd harmonics. Additionally or alternatively, synchronized sampling techniques or harmonic tracking can also be used to reduce the noise.

In accordance with an exemplary embodiment, the spectrum $S(\omega)$, e.g., as given in equation 22, can be used to estimate the thermal property of a medium surrounding the sensing cable. A characteristic frequency can be given as:

$$\omega^* = \frac{\alpha}{r_0^2}. \tag{28}$$

The complex argument to the Hankel functions can thus become:

$$\kappa r_0 = \sqrt{-j\frac{\omega}{\alpha}} r_0 \tag{29}$$

$$= \sqrt{\frac{\omega}{\omega^*}} e^{j\theta},$$

Where $\theta = 3/4\pi$ for $\omega > 0$. At low frequencies where $\omega/\omega^*$ (amplitude of $\kappa r_0$) is less than 1, the Hankel functions can be approximated as:

$$H_0^{(2)}(\kappa r_0) \approx 1 - \frac{(\kappa r_0)^2}{4} - j\frac{2}{\pi}\ln(\kappa r_0) \tag{30}$$

and:

$$H_1^{(2)}(\kappa r_0) \approx \frac{(\kappa r_0)}{2} - \frac{(\kappa r_0)^3}{16} + j\frac{2}{\pi}\frac{1}{\kappa r_0}. \tag{31}$$

The spectrum, S, can thus reduce to:

$$S(r_0, \omega) = \frac{\hat{\Omega}}{2\pi k} \hat{X}\left(\frac{\omega}{\omega^*}\right), \quad (32)$$

where the normalized transfer function, and temperature change response to the thermal excitation $\omega/2\pi k$ at frequency $\omega/\omega^*$ can be given as:

$$\hat{X}\left(\frac{\omega}{\omega^*}\right) = (R_s + jI_s) \quad (33)$$
$$= X e^{j\phi},$$

$$R_s \approx \frac{\frac{1}{32}\left(\frac{\omega}{\omega^*}\right)^2 + \frac{1}{2\pi}\frac{\omega}{\omega^*} + \frac{1}{2\pi}\left(\frac{\omega}{\omega^*} - \frac{4}{\pi}\right)\ln\left(\frac{\omega}{\omega^*}\right)}{\frac{1}{4}\left(\frac{\omega}{\omega^*}\right)^2 - \frac{2}{\pi}\left(\frac{\omega}{\omega^*}\right) + \frac{4}{\pi^2}}, \quad (34)$$

and $$I_s \approx \frac{\frac{5}{4}\left(\frac{\omega}{\omega^*} - \frac{4}{\pi}\right) - \frac{1}{16\pi}\left(\frac{\omega}{\omega^*}\right)^2 \ln\left(\frac{\omega}{\omega^*}\right)}{\frac{1}{4}\left(\frac{\omega}{\omega^*}\right)^2 - \frac{2}{\pi}\left(\frac{\omega}{\omega^*}\right) + \frac{4}{\pi^2}}, \quad (35)$$

after neglecting terms of higher order.

As disclosed herein, and in accordance with an exemplary embodiment of the disclosed subject matter, the amplitude and phase can decrease monotonically with frequency so that higher frequency corresponds with lower response of temperature to the heating. Accordingly, lower frequencies can obtain significant heating response and higher signals. Additionally, the imaginary part of the complex spectrum can be nearly linear with the frequency while the real part can exhibit linear behavior beyond certain frequency values. Therefore, the derivative of the transfer function spectrum with respect to frequency can lead to constants beyond certain values of $\omega/\omega^*$. One of ordinary skill in the art will appreciate that, mathematically, the spectral derivative is equivalent to the Fourier transform of the temperature rate with respect to the log of time. Thus there is connection of the derivative spectrum with the linear relationship of the temperature change with log(t) in the time domain as shown in equation 13.

As embodied herein, systems and methods in accordance with one aspect of the disclosed subject matter can include determining the liquid/gas flow distribution of a fluid through a component with a sensing cable including an optical fiber sensor array aligned with a heating/cooling element. The method can include propagating at least one heating/cooling pulse through the heating/cooling element along at least a portion of the sensing cable to affect an exchange of thermal energy between the heating element and the fluid exposed to the sensing cable. The method can also include measuring, over time, a temperature profile of the sensing cable corresponding to the heat pulse at each of a plurality of sensor locations on an optical fiber sensor array. The method can include determining a flow distribution of the fluid by determining one or more properties of the fluid exposed to the sensing cable at each of the plurality of sensor locations based on the temperature profile corresponding thereto.

For purpose of illustration and not limitation, reference is made to the exemplary embodiments of FIG. 1. The method and system disclosed herein can be used to determine flow distribution in variety of components and vessels. For example, the component can be a particulate bed, a wash bed including packing material, an absorbent bed, a structured bed, a filter, or the like. In operation, it can be desirable to determine flow conditions through such components. For example, fixed bed catalytic hydroprocessing reactors, such as hydrotreating reactors and hydrocracking reactors, can develop flow (liquid or gas) maldistribution and corresponding localized "hot spots." which can cause a runaway condition in exothermic reactions within the reactor. This flow maldistribution in the catalyst bed (or multiple catalyst beds) of hydroprocessing reactors can be due to catalyst loading or density maldistributions, but can also be due (at least in part) due to localized coking of the catalyst beds. If such localized coking and flow maldistribution can be properly identified, mitigation steps could often be taken. Mitigation steps that are available to such operations may include altering the amount, composition or distribution of liquid feeds or quench gases, or altering reactor operating conditions, such as temperatures or pressures, to mitigate further coking and/or improve the flow distribution through the affected reactor catalyst beds. In an embodiment, the component is a hydroprocessing reactor (i.e., a reactor vessel for catalytically reacting a hydrocarbon in the presence of a catalyst and hydrogen) which includes a particulate bed, and the particulate bed is comprised of catalyst particles. In a preferred embodiment, such catalyst particles are comprised of a hydrodesulfurization catalyst (i.e., a catalyst effective for removing sulfur atoms/compounds from hydrocarbons), a hydrodenitrogenation catalyst (i.e., a catalyst effective for removing nitrogen atoms/compounds from hydrocarbons), a hydrodeoxygenation catalyst (i.e., a catalyst effective for removing oxygen atoms/compounds from hydrocarbons), a hydrocracking catalyst (i.e., a catalyst effective for cracking hydrocarbons into lower molecular weight compounds), a hydroreforming catalyst (i.e., a catalyst effective for producing aromatic hydrocarbon compounds from non-aromatic hydrocarbons), a hydroisomerization catalyst (i.e., a catalyst effective for producing iso-paraffinic compounds from non-iso-paraffinic hydrocarbons), or any combination thereof.

As another example, liquid/gas maldistribution can occur in components such as the wash beds of a vacuum pipe still ("VPS") distillation tower, which can cause problems such as unplanned capacity loss, increased operational costs, and increased energy usage. Determination of flow distribution of a fluid through such components can allow for mitigation strategies, such as increasing the flow rate of wash oil or otherwise varying operational parameters of the component. Accordingly, the techniques disclosed herein can be employed to determine the flow distribution of a fluid through a component in connection with a refining operation. However, it is recognized that the system and method herein can be applied to numerous other environments and vessels in which the determination of flow distribution is beneficial.

Figure 1B:
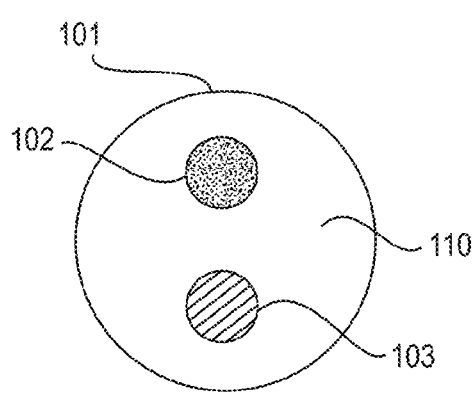
FIG. 1B is a cross sectional view of an exemplary sensing cable configuration in accordance with the disclosed subject matter.
Figure 1C:
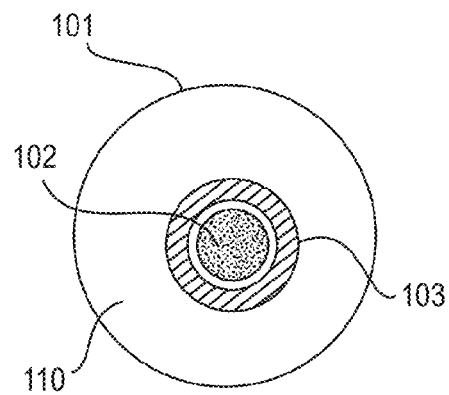
FIG. 1C is a cross sectional view of another exemplary sensing cable configuration in accordance with the disclosed subject matter.

In accordance with this exemplary embodiment, the system for detecting a liquid/gas flow distribution vessel can include the components and features described herein with reference to FIG. 1A-C. The sensing cable (e.g., sensing cable 101) can further include an anti-fouling coating to resist fouling and/or coking deposition on the sensing cable. For example, the sensing cable can be coated with a suitable coating to resist coking, such as Teflon, or coatings formed from modified fluoropolymer and co-polymer reinforcements. These coatings can be engineered for high release (non-stick), non-wetting, thermal stability, dielectric strength and chemical resistance, where comparatively thin films are desired or otherwise beneficial.

Using the system as disclosed, and suitable modifications as desired, a method of determining the flow distribution of a fluid through a component can include the techniques disclosed herein with reference to FIG. 1A through FIG. 5. For purpose of example, and with reference to FIG. 10, the method of determining the flow distribution of a fluid through a component will be described in connection with certain exemplary embodiments, wherein the vessel is a fixed bed, such as in a fixed catalyst bed of a hydroprocesssing (e.g., hydrotreating or hydrocracking) reactor or a fixed structured wash oil bed of a VPS distillation tower. One of ordinary skill in the art will appreciate that the techniques disclosed herein can be applied in connection with a variety of suitable components, and the disclosed subject matter is not intended to be limited to the exemplary embodiments disclosed herein.

Figure 8:
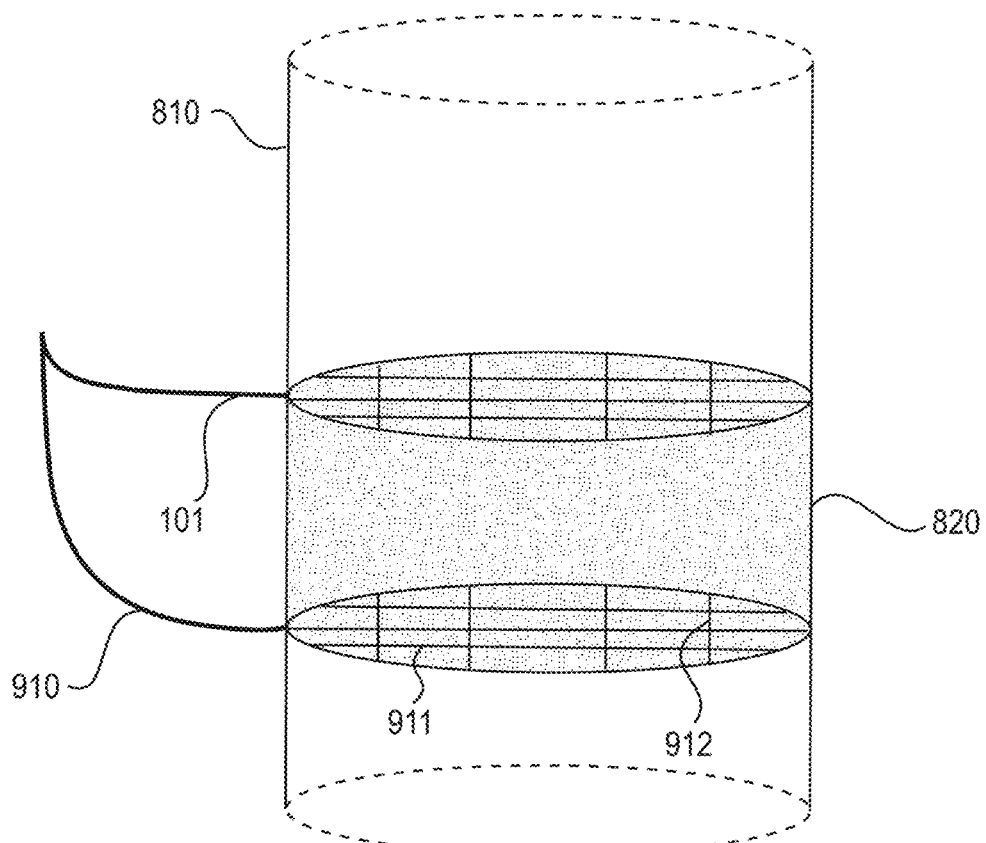
FIG. 8 is a schematic representation of a plurality of sensing cables arranged in grid patterns in accordance with an exemplary embodiment of the disclosed subject matter.
Figure 10:
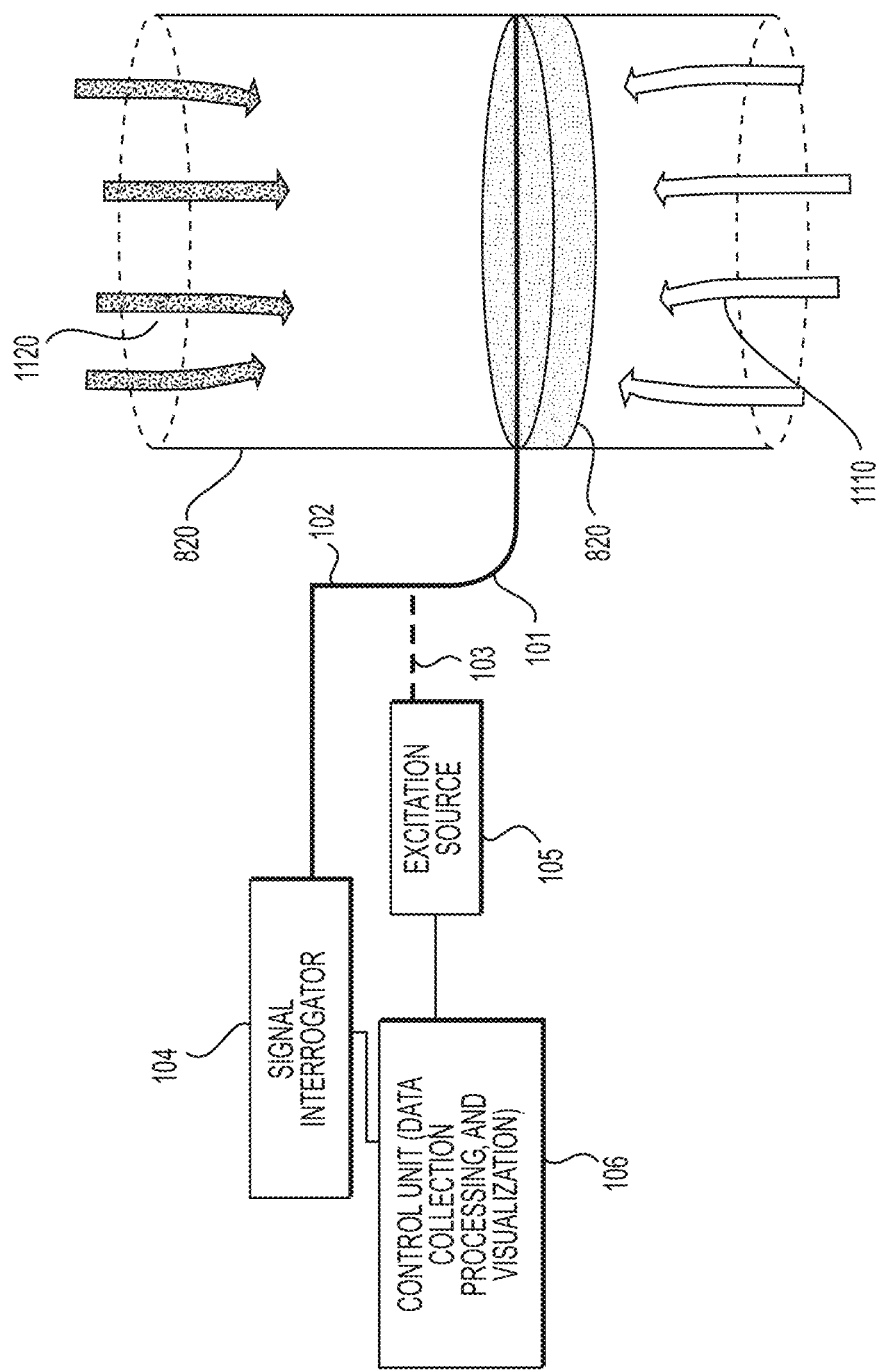
FIG. 10 is a schematic representation of a system for determining flow distribution through a component in accordance with an exemplary embodiment of the disclosed subject matter.

With reference to FIG. 10, the method of flow through a vessel 810 can include positioning a sensing cable 101 within a wash bed 820 of a VPS distillation tower 810. For example, the sensing cable 101 can be positioned across a surface of the wash bed 820 such that the sensing cable 101 is aligned perpendicular to an axis of the vessel 810. In this manner, sensor locations along the sensing cable 101 can correspond to locations about a cross section of the vessel 810. The sensing cable 101 likewise can be positioned and/or arranged in a variety of other suitable configurations as desired or needed. For example, the sensing cable 101 can be positioned parallel to an axis of the vessel 810 with the sensor locations along the sensing cable 101 generally correspond to locations along a vertical axis within the vessel 810, such as along an inside wall of the vessel 810. Moreover, as shown in FIG. 8, the sensing cable 101 can be arranged in a grid pattern or array 911 and 912, or any other suitable pattern, about a surface of the wash bed 820 or otherwise within the vessel 810. One of ordinary skill in the art will also appreciate that more than one sensing cable can be employed. For example, as depicted in FIG. 8, a second sensing cable 910, which can also be positioned in a grid pattern, can be positioned on an opposite surface of the wash bed 820.

As previously noted, the sensing cable 101 includes a heating/cooling element 103, such as a heating wire, and an optical fiber sensor array 102, as disclosed herein. The optical fiber includes a plurality of sensing locations along the length of the fiber, such that each sensing location corresponds to a position about the surface of the wash bed 820. For example, and as previously noted, the optical fiber can include a plurality of sensors along its length and/or a single fiber sensor can be movable to define a plurality of sensor locations. The optical fiber sensor is coupled to an optical signal interrogator 104 to process an optical signal therein to obtain temperature measurements at each of the sensor locations. The optical signal interrogator 104 can further be coupled to a control unit 106 to process the temperature measurements.

As previously described herein, the heating wire is coupled to an excitation source 105 adapted to propagate electromagnetic waves (e.g., current 210) through the heating wire, thereby creating corresponding heat pulses (e.g., heat pulse 220). As the heat pulses propagate through the heating wire, heat is exchanged between the heating wire, the sensing cable, and the surrounding media at each sensor location. The temperature at each sensor location can be recorded, e.g., via the optical signal interrogator and control unit, to generate a temperature profile for each sensor location. For example, temperature can be measured as a function of time at each sensor location along the optical fiber. The temperature profile at each sensor location generally will correspond to the characteristics of the medium surrounding the sensing cable at that sensor location. In this manner, for purpose of illustration, sensor locations over which fluid in the vessel 810 is flowing can result in a temperature profiles distinguishable from sensor locations over which fluid is not flowing.

The temperature profile (i.e., the temperature as a function of time at a sensor location) can generally exhibit an increase in temperature coinciding with the exposure to the heat pulse at the corresponding sensor location. For purpose of illustration, and not limitation, and with reference to the laws of thermodynamics, the temperature will generally increase over the duration of the heat pulse at a rate corresponding to the characteristics of the surrounding media, and thereafter decrease as the heat from the heat pulse diffuses into the surrounding media at a rate corresponding to the characteristics of the surrounding media. Thus, the temperature profiles for each sensor location can correspond to the characteristics of the surrounding media, e.g., the rate of flow of the surrounding media. For example, and not limitation, at a sensing location over which the surrounding fluid has a substantial flow, the heat transfer from the heating wire into the surrounding media can be relatively high due to convective heat transfer arising from the flow, and thus a cold spot/region can be detected. By contrast, at a sensing location exposed to stationary media, the heat transfer from the heating wire into the surrounding media can be relatively low due to the lack of convective heat transfer, and thus a hot spot/region can be detected. That is, for purpose of illustration, and with reference to Equation 1 and Equation 3, heat loss at a particular sensor location can depend on the rate of flow of the fluid surrounding that sensor location due to convective heat transfer from the sensing cable into the surrounding fluid. Additionally, assuming a homogenous medium of constant temperature flowing within the component, the flow rate of the medium can be determined at each sensor location. Moreover, assuming a medium having a non-uniform temperature and substantially constant flow across the sensing cable, the temperature of the medium without heating pulse can be measured first, follow by measurement of the temperature of the medium with heating pulse. The difference between the temperature measurement without the heating pulse and the temperature measurements with the heating pulse can indicate the flow rate of the medium.

Figure 11:
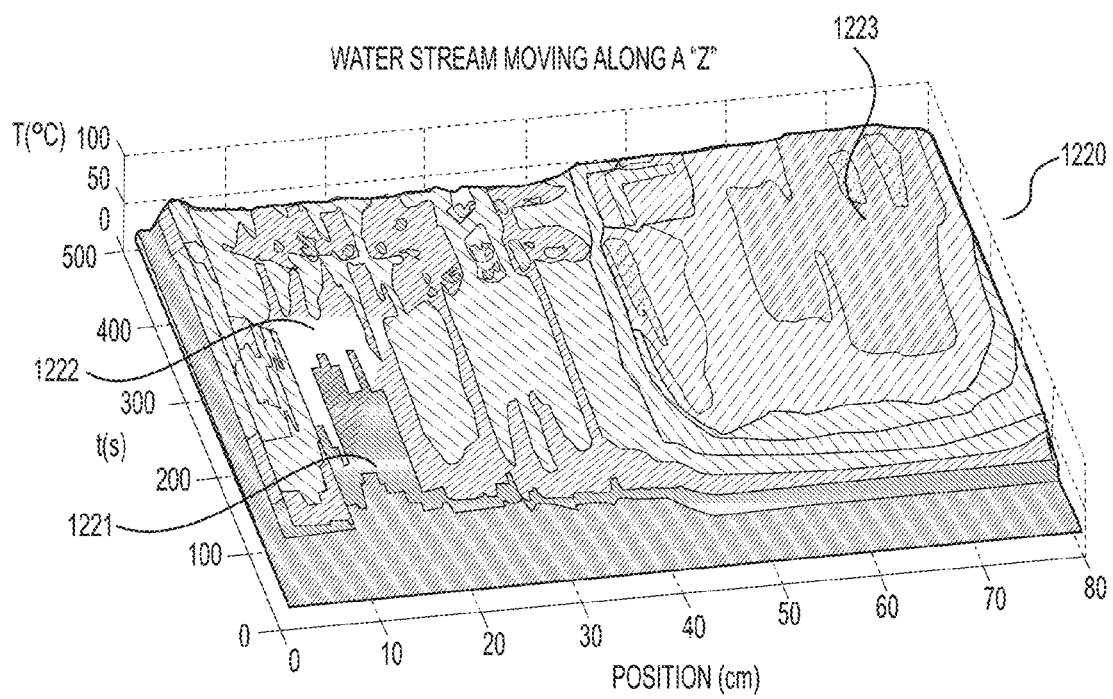
FIG. 11 is an image and graph illustrating an exemplary system and method for determining flow distribution through a component in accordance with the disclosed subject matter.
Figure 11:
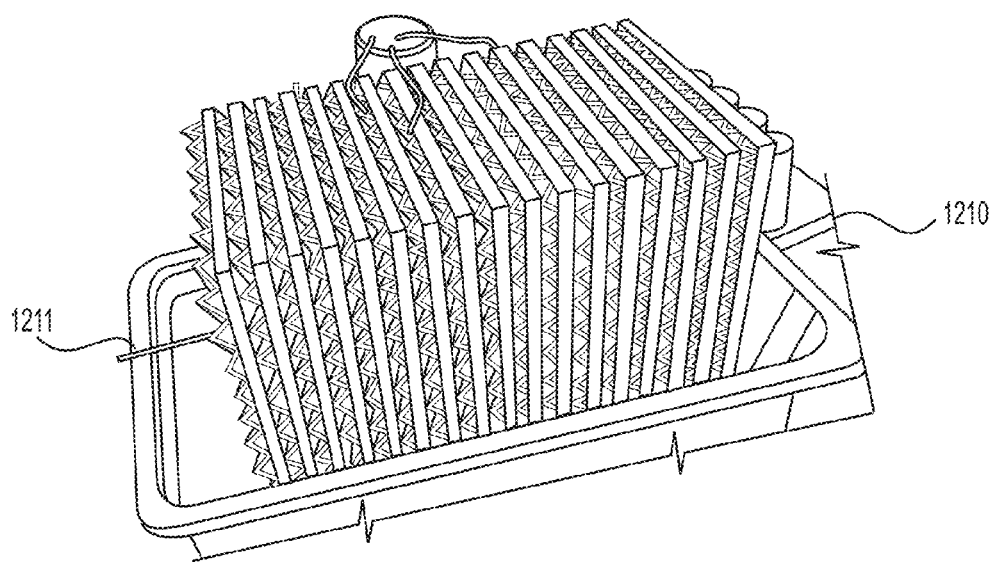

For purpose of illustration, and not limitation, reference will be made to an example of the method disclosed herein with reference to FIG. 11. FIG. 11 includes an image 1210 of a sensing cable 1211 embedded between two layers of packing material. The sensing cable 1211 can include an optical fiber sensor array adjacent a heating wire. A water stream can be arranged to flow through a portion of the packing material (e.g., from the top layer, over the sensing cable 1211, and through the bottom layer). As depicted in the image 1210 of FIG. 11, the water stream is initially directed through the packing material at a location approximately corresponding to 10-20 cm along the sensing cable 1211. As a heat pulse propagates through the heating wire, heat is exchanged between the heating wire, the sensing cable 1211, the surrounding packing material, air, and the water stream flowing over the sensing cable 1211. During heating, overall temperature readings at each sensor location increase, and the temperature profile reveals the location of the water stream. For example, FIG. 11 includes a plot 1220 of temperature (z-axis) versus sensor location in meters (x-axis) as a function of time (y-axis). Plot 1220 shows a trough of cooler temperature profiles corresponding to the water stream due to convective heat loss. The region 1223 of plot 1220 corresponds to the sensor locations along the sensing cable 1221 exposed to air and outside packing material, and illustrates a relatively higher temperature profile due to lack of convective heat loss. As depicted in FIG. 11, at approximately 400 seconds, the water stream was moved back and forth about the sensing cable 1211. As illustrated by plot 1220, wherever the water flow passes over the sensing cable 1221, the temperature profiles at corresponding sensor locations 1222 will be lower. The "Z" pattern represents a cold temperature region can is caused by the water stream moving back and forth.

As disclosed herein, the control unit thus can be adapted to determine the characteristics of the surrounding media at each sensor location using a variety of techniques, and thereby determine the flow distribution of a fluid through a component. For example, referring again to FIG. 10, the control unit 106 can be adapted to determine, with reference to the known positions of the sensor locations and the corresponding temperature profiles, a relative rate of flow at each sensor location and thus determine the flow distribution of the media surrounding the sensing cable. In connection with the operation of a VPS distillation tower 810, for example, vapor 1110 can flow upwards through one or more wash beds 820 such that different fractions (i.e., different petrochemicals in the vapor) can be separated. However, during operation, coking can occur on the wash bed, which can create uneven flow of vapor 1110 through the tower 810. Accordingly, the methods disclosed herein can determine the flow distribution of the vapor 1110 and thus detect a maldistribution condition associated with coking. VGO wash oil 1120 can be introduced into the VPS distillation tower 810 to prevent the formation of coke deposits, for example upon detection of a coking condition. The methods disclosed herein can likewise determine the flow rate and distribution of the wash oil 1120.

For purpose of illustration, and not limitation, the direct temperature measurement techniques described above can be used to determine the flow distribution of a fluid through a component. Particularly, a feature temperature profile (e.g., including three temperature measurements corresponding to a heating period, a peak temperature measurement, and a cooling period) can be extracted and processed to determine characteristics of the medium surrounding each sensor location. For example, and as depicted in FIG. 11, the temperature profile of sensors exposed to a medium having a flow characteristic can have a relative low peak, heating, and cooling temperature relative to the temperature profile of sensors exposed to a stationary medium of the same kind.

Alternatively, and as described herein with reference to FIG. 4B, a log-time regression technique can be used to determine certain characteristics of the medium surrounding each sensor location by further processing the temperature profile at each sensor location. That is, by performing the regression of the temperature over log of time over an interval of time corresponding to each heat pulse for each sensor location, the resulting slope and intercept of the regression can be used to identify characteristics of the medium. For example, the slope and intercept of sensor locations exposed to a medium having a flow characteristic can be distinguishable from the slope and intercept of sensor locations exposed to the same medium having a stationary characteristic.

In accordance with another exemplary embodiment of the disclosed subject matter, the frequency spectrum techniques disclosed herein with reference to FIG. 5A-C can be employed to determine the flow distribution of a fluid through a component with increased measurement sensitivity, accuracy, and/or reliability. In this exemplary embodiment, and as described above, an N-pulse train can be propagated through the heating wire of the sensing cable 101 with pre-selected parameters, including heating cycle period, $t_0$, number of heating cycles, N, and current amplitude, $I_0$. The parameters can be selected according to the operating characteristics of the component such that the resulting temperature profile can be measured with a desired signal-to-noise ratio. For example, a longer heating cycle period or higher current amplitude can result in higher signal-to-noise ratio relative to a shorter heating cycle period or lower current amplitude. Likewise, an increase in the number of heating cycles can further increase the signal-to-noise ratio. One of ordinary skill in the art will appreciate that such parameters can be varied depending upon desired application. For example, if determination of flow distribution is desired at short time intervals, a shorter heating cycler period and a higher current amplitude can be employed. For purpose of example, and not limitation, in connection with a fixed bed reactor or VPS distillation tower having a diameter of approximately 20 to approximately 40 feet, approximately 4 to 5 layers of wash bed packing materials, and a total height of approximately 6 to approximately 10 feet. The heating cycle period for the sensing cable can be approximately 1 Hz or slower (i.e., the excitation source can be adapted to deliver a current pulse at 1 Hz or slower. The current amplitude can be several mili-amperes to several amperes. One of ordinary skill in the art will appreciate that, in accordance with the disclosed subject matter, suitable frequency and current amplitude can be determined for a particular application by routine testing in accordance with known methods.

The optical signal interrogator 104 can be adapted to measure temperatures from the optical fiber at a pre-selected sampling frequency. In accordance with an exemplary embodiment, the sampling frequency can be at least twice the expected frequency of the temperature profile and/or heat pulse. For example, and not limitation, in connection with a fixed bed reactor or VPS distillation tower, the sampling frequency can be 10 Hz. The derivative with respect to time of the temperature measurements for each sensor location can then be generated. For example, the measured temperatures a sensor location at each sampling interval can be given as a temperature series. The difference between each temperature in the series can then be calculated to generate a temperature derivative series. A transform (e.g., a FFT or DFT) can be applied to convert the temperature derivative series into the frequency domain, and thus generate a spectrum of time series of temperature differences for each sensor location. The derivative of the spectrum, with respect to the frequency, can be generated. That amplitude and phase of the frequency-derivative spectrum (e.g., the real and imaginary parts of the complex frequency-derivative spectrum) can then be determined. For example, using the heating cycle period, $t_0$, the real and imaginary values of the spectrum at the fundamental frequency of the N-pulse train can be selected at $f_0 = 1/t_0$.

The amplitude and phase of the frequency-derivative spectrum at each sensor location thus can correspond to the characteristics of the medium surrounding the sensing cable 101 at a particular sensor location. For example, the amplitude and phase can decrease monotonically with frequency so that higher frequency corresponds with lower response to a change in temperature from the heating element. Accordingly, lower frequencies can obtain significant heating response and higher signals. Additionally, the imaginary part of the complex spectrum can be nearly linear with the frequency while the real part can exhibit linear behavior beyond certain frequency values. Therefore, the derivative of the transfer function spectrum with respect to frequency can correspond to the linear relationship of the temperature change with log(t) in the time domain. In this manner, the amplitude and phase of sensor locations exposed to a flowing medium can be distinguishable from the amplitude and phase of sensor locations exposed to non-flowing medium of the same kind, or a higher-velocity flowing medium from a lower-velocity flowing medium.

The sensing cable 101 can be calibrated, e.g., with the control unit. Calibration can include, for example, calibrating the sensor array to determine the amplitude and phase of the frequency-derivative spectrum of certain known media. For example, a number of materials with known thermal properties can be measured for a broad range of values and for a broad range of flow rates, and a database can be constructed including correlations between the generated amplitude and phase and characteristics, such as flow rate, of the known materials. The database can then be used as to determine the flow rate of the surrounding medium at a particular sensor location in the vessel.

The control unit 106, with reference to the known locations of each sensor and the corresponding amplitude and phase of the frequency-derivative spectrum, can determine the flow distribution of a fluid through the component. To determine the flow distribution, the control unit can be configured to store the known position of each sensor location in one or more memories. For example, for a 36 inch long sensing cable, having 36 sensor locations each spaced apart by a unit inch, positioned about the surface of a 36 inch wash bed 820, the control unit can store the distance of each sensor location from the wall of the component 810 (i.e., for sensor location $i=\{1, 2, \ldots, 36\}$, the control unit can store a corresponding distance measurement $D_i=\{1 \text{ in}, 2 \text{ in}, \ldots, 36 \text{ in}\}$). For each sensor location, i, the control unit can determine the amplitude and phase of the frequency derivative spectrum as disclosed herein. With reference to, for example, a database storing the amplitude and phase of the frequency derivative spectrum for known flow rates of the known media, the control unit can thus determine the relative flow rate at each sensor location and thus the flow distribution using the determined amplitude and phase at each sensor location.

Additionally or alternatively, and as embodied herein, the control unit can process the determined amplitude or phase of the frequency derivative spectrum of adjacent sensor locations to determine the flow distribution. That is, for example, assuming the vessel contains media with otherwise constant characteristics, a change in the amplitude across two sensor locations can correspond to a different flow rate across the two sensor location. Likewise, a change in the phase can correspond to a different flow rate of the same media. In certain embodiments, the control unit can process both the amplitude and phase of adjacent sensors to enhance determination of flow distribution. For example, a change in both the amplitude and phase can correspond a different flow rate across the two sensors. Moreover, in certain embodiments, the control unit can monitor the amplitude and phase of each sensor location over time (e.g., throughout the operation of a VPS distillation tower) and determine whether the temperature profile of one or more sensor locations changes with time. For example, the control unit can be configured to monitor the temperature profile of one or more sensor locations over time, identify a change in said temperature profile and, with reference, e.g., to a database of known characteristics corresponding to flow rate, determine the flow distribution.

In another exemplary embodiment, multiple layers of sensors can be deployed between different layers of packing materials, for example as depicted in FIG. 8. Measurement from each layer of sensor can reveal localized conditions, such as the flow rate at each sensor location. In this manner, entrainment of resid can be inferred by comparison of measurement results across sensor layers.

The techniques disclosed herein can provide for continuous determination of flow distribution through a component. No moving mechanical parts need be included inside the sensing cable. Because material thermal properties can be measured for determination of flow distribution, the measurement results can be independent of electrical conductivity, salinity, and crude oil constituents, such as sulfur, iron sulfide/oxide. Moreover, relative temperature changes before and after heating/cooling can be used to infer material thermal properties for determination of flow distribution, and temperature baseline can be taken each time before heating/cooling is applied. Accordingly, the methods disclosed herein need not require long term stability for temperature sensors.

Moreover, the system disclosed herein can operate at temperatures ranging from cryogenic temperatures up to over 1000° C. The size of the sensing cable can be relatively small (e.g., compared to conventional thermocouples) and can be cost effective for large area coverage with a large amount of sensors. Utilizing cost-effective optical fiber temperature sensors, the system disclosed herein can incorporate a large number of sensors, and can offer a high spatial resolution, e.g., less than 1 mm, over a long measurement range, e.g., several meters to kilometers. The diameter of the compact sensing cable can small, e.g., less than 2 mm. The small diameter of the sensing cable can allow for measurement in a tight space with reduced intrusiveness. Furthermore, the heating/cooling element can be turned off, and the sensing cable can be converted to a temperature sensor, which can provide absolute temperature measurements inside the vessel, such as measurements of the wash bed packing materials. Such absolute temperature measurements can be used to infer liquid/vapor distributions, for example, inside packing materials, where temperature differences between liquid and vapor exist.

Additionally and/or alternatively to the systems and methods for determining fluid flow distributions, as described above, the disclosed subject matter further includes systems and methods for detecting a deposit in a vessel using a sensing cable including an optical fiber sensor array aligned with a heating/cooling element. The method can include propagating at least one heating/cooling pulse through the heating/cooling element along at least a portion of the sensing cable to affect an exchange of thermal energy between the heating element and one or more media exposed to the sensing cable. The method can further include measuring, over time, a temperature profile of the sensing cable corresponding to the heat pulse at each of a plurality of sensor locations on an optical fiber sensor array. The method can include detecting a deposit by determining one or more properties of the materials exposed to the sensing cable at each of the plurality of sensor locations based on the temperature profile corresponding thereto.

For purpose of illustration and not limitation, reference is made to the exemplary embodiments of FIG. 1. The method and system disclosed herein can be used to detect a variety of types of deposits in any of a number of components and vessels. For example, formation of deposits such as debris, bio-growth, inorganic or organic fouling, water condensation, coke, and the like within a component of a refinery can be detecting using the system and method herein. Such components include, but are not limited to a vessel of a heat exchanger, a furnace tube, a pipe of a production well, a pipeline, a tray or packing material of a distillation tower, a hydroprocessing reactor, a polymerization reactor, a wash bed in a distillation tower, such as a vacuum pipe still (VPS) distillation tower, or the like. In operation, formation of such deposits can cause problems, such as capacity loss, increased operational costs, and increased energy usage. Detection of the onset of the formation of deposits within the component at an early stage can allow for mitigation strategies, such as increasing the flow rate of wash oil to remove coking. If such coking (or coking precursors) can be detected at the early stage of formation, mitigation techniques, such as administering a wash oil, can be effective; wherein in later stages of coke formation (such as in the formation of "hard coke") removal of these deposits can be difficult, if not impossible, to achieve with on-line/in-service techniques. Accordingly, the techniques disclosed herein can be employed to detect the formation of deposits in a vessel in connection with a refining operation. However, it is recognized that the system and method herein can be applied to numerous other environments and vessels in which the detection of deposits is beneficial or desired.

In accordance with this exemplary embodiment, a system for detecting a deposit in a vessel can include the components and features described herein with reference to FIG. 1A-C. The sensing cable (e.g., sensing cable 101) can further include a coating with an affinity for fouling resembling that of the interior of the vessel. For example, stainless steel, protective polymer coatings, or other suitable coatings can be applied to the sensing cable in connection with detection of deposits in components having a fouling affinity similar to that of stainless steel or polymer coatings, respectively. It is recognized that a variety of suitable coatings can be employed, the selection of which can depend on the desired application environment.

Additionally, the sensing cable (e.g., sensing cable 101) can further include a shield to establish an approximately stationary condition of the surrounding media in a region proximate the sensing cable. As used herein, the term "approximately stationary" can include a static condition, or a flow pattern in which energy transferred from the sensing cable to the surrounding media is substantially conductive, rather than convective. Such flow conditions can include steady laminar flow, or an area of turbulent flow (e.g., a plurality of eddies) wherein the mean flow velocity is approximately stationary. Additionally or alternatively, and as previously described, such a shield can be constructed to protect the sensing cable from damage due to solids in the surrounding media.

Figure 6:
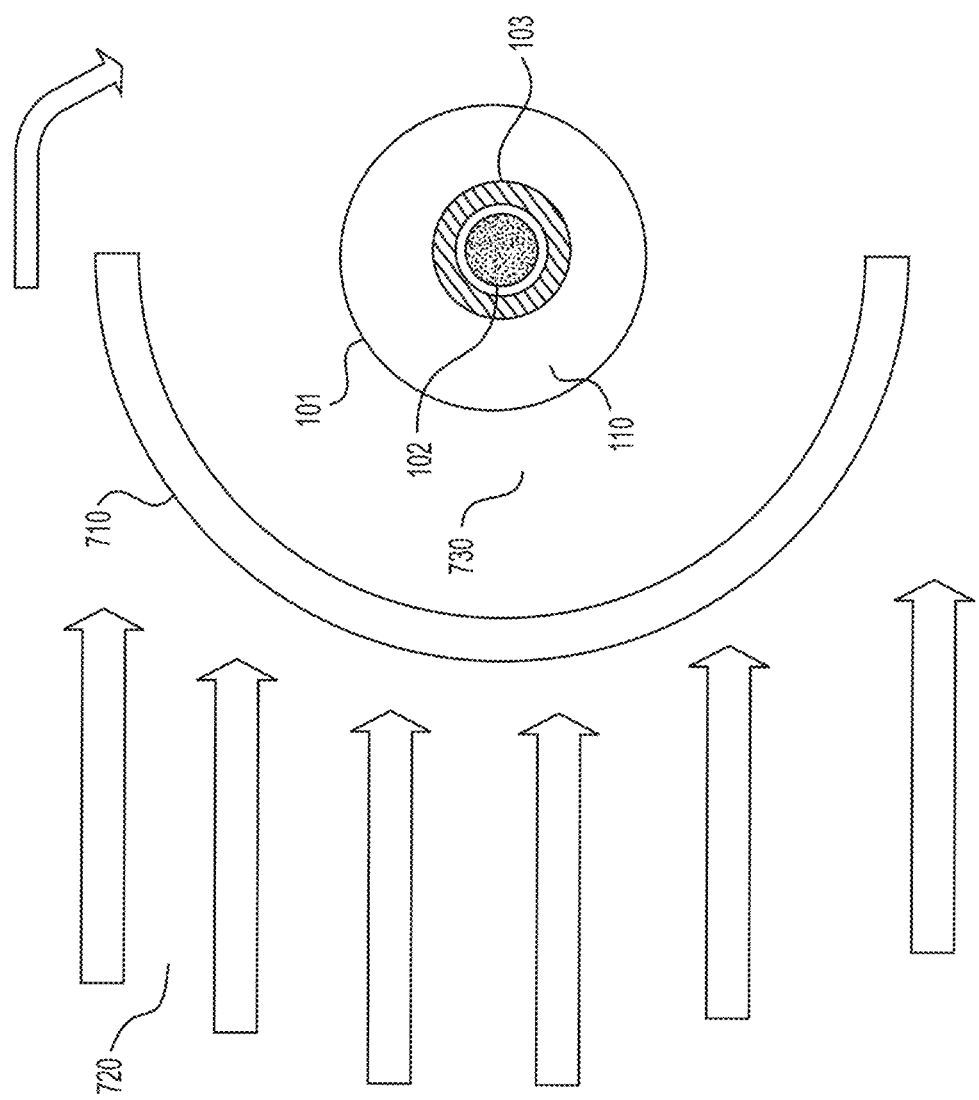
FIG. 6 is a schematic cross sectional view of a representative embodiment of a shield for a cable configuration in accordance with an exemplary embodiment of the disclosed subject matter.

For purpose of illustration, and not limitation, FIG. 6 provides a schematic depiction of a shield in accordance with an exemplary embodiment of the disclosed subject matter. With reference to FIG. 6, the shield 710 can have a semicircular or other suitable shape and can be disposed upstream of the sensing cable 101 to protect and eliminate flow conditions immediately adjacent the sensing cable 730. If the media surrounding the sensing cable has, for example, a laminar flow 720, the shield 710 can create an approximately stationary region 730 proximate the sensing cable 101 such that heat transfer due to convection and other anomalies resulting from flow conditions is reduced. Any of a variety of suitable materials of construction for the shield can be used, depending on surrounding environmental conditions, such as corrosion and fouling resistant metal or ceramic for high temperature environment or polymer for lower temperature environments. The size of the shield can be large enough to protect the sensor and reduce turbulent flow around the sensor. One of ordinary skill in the art will appreciate that a variety of other suitable shield configurations are possible, and the scope of the disclosed subject matter is not intended to be limited to the exemplary embodiments disclosed herein.

Using the system as disclosed, and suitable modifications as desired, a method of detecting a deposit in a vessel can include the techniques disclosed herein with reference to FIG. 1A through FIG. 5. For purpose of example, and with reference to FIG. 7, the method of detecting a deposit in a vessel will be described in connection with certain exemplary embodiments, wherein the vessel is a VPS distillation tower 810 and the deposit to be detected is coking 825 formed on a wash bed 820 of the VPS distillation tower 810. One of ordinary skill in the art will appreciate that the techniques disclosed herein can be applied in connection with a variety of suitable vessels and deposits, and the disclosed subject matter is not intended to be limited to the exemplary embodiments disclosed herein.

Figure 7:
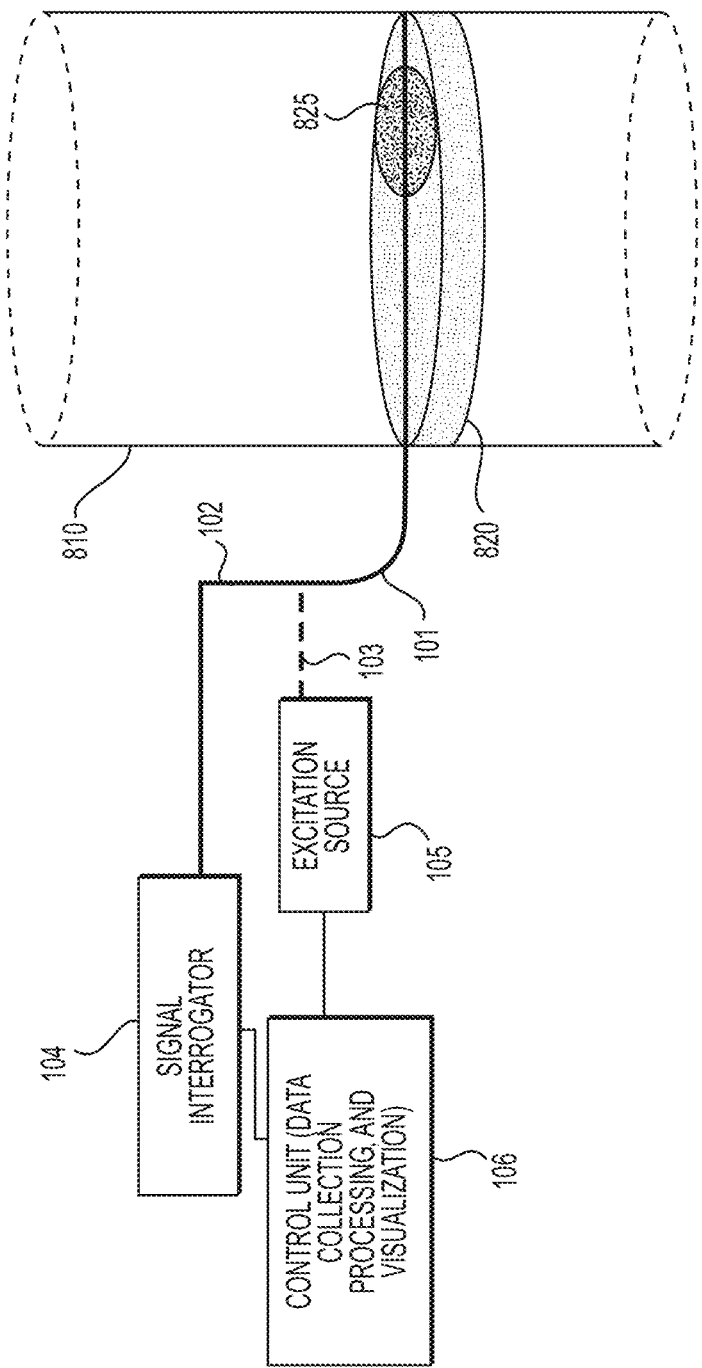
FIG. 7 is a schematic representation of a system for detecting a deposit in a vessel in accordance with an exemplary embodiment of the disclosed subject matter.

With reference to FIG. 7, the method of detecting coking in a vessel 810 can include positioning a sensing cable 101 within a wash bed 820 of the VPS distillation tower 810. For example, the sensing cable 101 can be positioned across a surface of the wash bed 820 such that the sensing cable 101 is aligned perpendicular to an axis of the vessel 810. In this manner, sensor locations along the sensing cable 101 can correspond to locations about a cross section of the vessel 810. The sensing cable 101 likewise can be positioned and/or arranged in a variety of other suitable configurations as desired or needed. For example, the sensing cable 101 can be positioned parallel to an axis of the vessel 810 with the sensor locations along the sensing cable 101 generally corresponding to locations along a vertical axis within the vessel 810, such as along an inside wall of the vessel 810. Moreover, as shown in FIG. 8, the sensing cable 101 can be arranged in a grid pattern or array, or any other suitable pattern, about a surface of the wash bed 820 or otherwise within the vessel 810. One of ordinary skill in the art will also appreciate that more than one sensing cable can be employed. For example, as depicted in FIG. 8, a second sensing cable 910, which can also be positioned in a grid pattern 911 and 912 with a known sensor density coverage, e.g., one sensor per square foot, can be positioned on an opposite surface of the wash bed 820.

As previously noted, the sensing cable 101 includes a heating/cooling element 103, such as a heating wire, and an optical fiber sensor array 102, as disclosed herein. The optical fiber includes a plurality of sensing locations along the length of the fiber, such that each sensing location corresponds to a position about the surface of the wash bed 820. For example, and as previously noted, the optical fiber can include a plurality of sensors along its length and/or a single fiber sensor can be movable to define a plurality of sensor locations. The optical fiber sensor is coupled to an optical signal interrogator 104 to process an optical signal therein to obtain temperature measurements at each of the sensor locations. The optical signal interrogator 104 can further be coupled to a control unit 106 to process the temperature measurements.

As previously described herein, the heating wire is coupled to an excitation source 105 adapted to propagate electromagnetic waves (e.g., current 210) through the heating wire, thereby creating corresponding heat pulses (e.g., heat pulse 220). As the heat pulses propagate through the heating wire, heat is exchanged between the heating wire, the sensing cable, and the surrounding media at each sensor location. The temperature at each sensor location can be recorded, e.g., via the optical signal interrogator and control unit, to generate a temperature profile for each sensor location. For example, temperature can be measured as a function of time at each sensor location along the optical fiber. The temperature profile at each sensor location generally will correspond to the characteristics of the medium surrounding the sensing cable at that sensor location. In this manner, for purpose of illustration, sensor locations that are in proximity to deposits (e.g., coking 825) can result in a temperature profiles distinguishable from sensor locations not in proximity to deposits.

The temperature profile (i.e., the temperature as a function of time at a sensor location) can generally exhibit an increase in temperature coinciding with the exposure to the heat pulse at the corresponding sensor location. For purpose of illustration, and not limitation, and with reference to the laws of thermodynamics, the temperature will generally increase over the duration of the heat pulse at a rate corresponding to the characteristics of the surrounding media, and thereafter decrease as the heat from the heat pulse diffuses into the surrounding media at a rate corresponding to the characteristics of the surrounding media. Thus, the temperature profiles for each sensor location can correspond to the characteristics of the surrounding media, e.g., via the heat capacity of the particular media. For example, and not limitation, at a sensing location exposed to a deposit, such as a region of coking 825 in the wash bed 820, the heat transfer from the heating wire into the surrounding coke 825 can be relatively low due to the low heat capacity and low conductance of coke, and thus temperature is high at this location and shown as a hot spot. By contrast, at a sensing location exposed to other media in the vessel 810, such as vapor or other effluent, the heat transfer from the heating wire into the surrounding media can be relatively high due to the relatively higher heat capacity and higher conductance of the surrounding effluent, and thus temperature is low at this location and is shown as a cold spot.

Figure 9A:
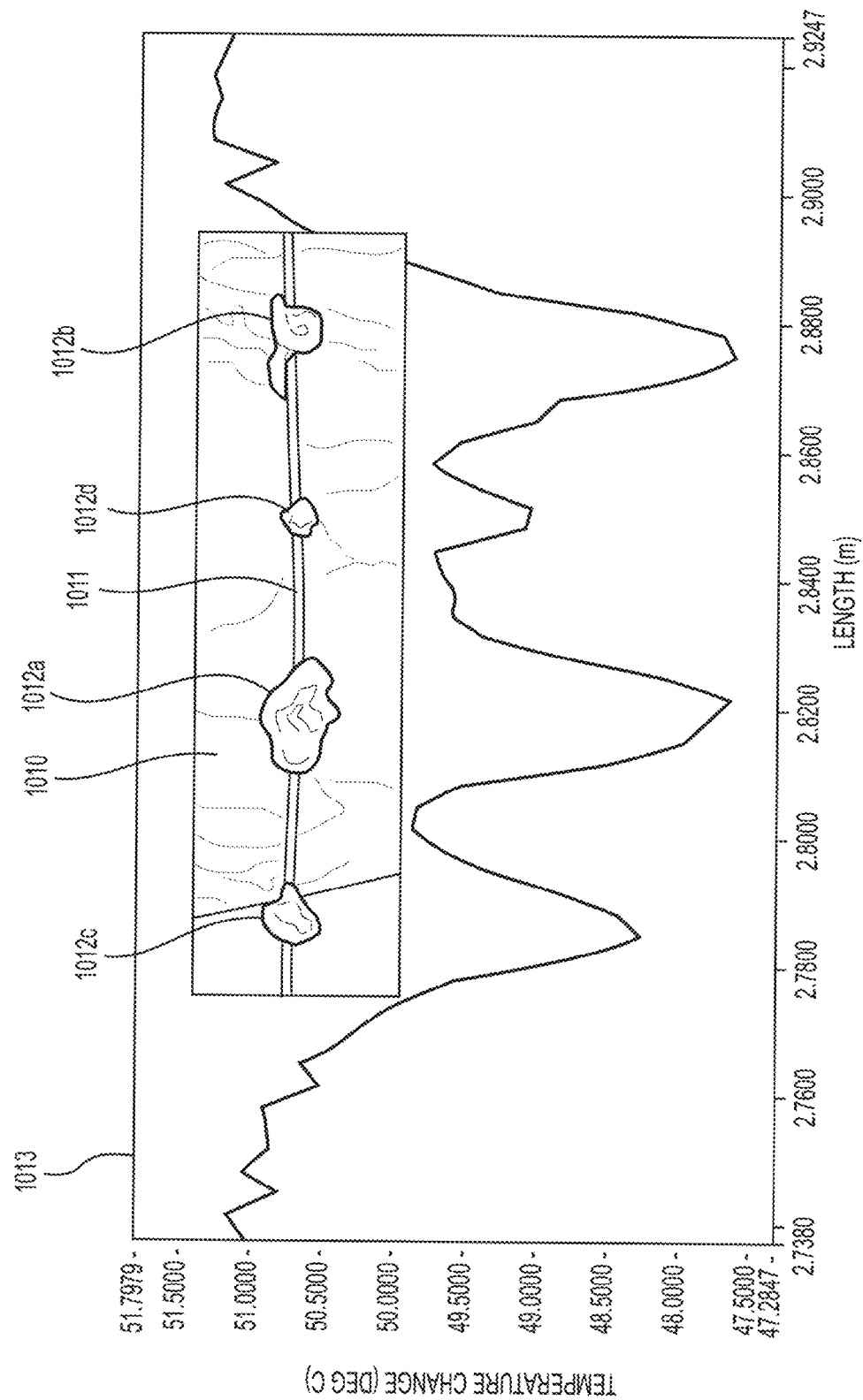
FIG. 9A is an image and graph illustrating an exemplary system and method for detecting a deposit in a vessel in accordance with the disclosed subject matter.

For purpose of illustration, and not limitation, reference will be made to examples of the methods disclosed herein with reference to FIGS. 9A-C. FIG. 9A, includes an image of a sensing cable 1011, including an optical fiber sensor array adjacent a heating wire inside a capillary tube, with four solid resid (i.e., coke) deposits (including deposits 1012a, 1012b, 1012c and 1012d or collectively, 1012) located at intervals along the sensing cable 1011. Initially, for purpose of illustration, the sensing cable 1011 and deposits 1012 herein are at room temperature. As a heat pulse propagates through the heating wire, heat is exchanged between the heating wire, the sensing cable, the surrounding air, and the coke deposits 1012. During heating, overall temperature readings at each sensor location increase, and the temperature profile reveals the locations and amount of coke deposits. For example, FIG. 9A includes a plot 1013 of temperature (y-axis) versus sensor location in meters (x-axis). Plot 1013 includes "dips" in the temperature profile corresponding to lower temperature regions caused by extra thermal mass from various sizes of coke deposit.

Figure 9B:
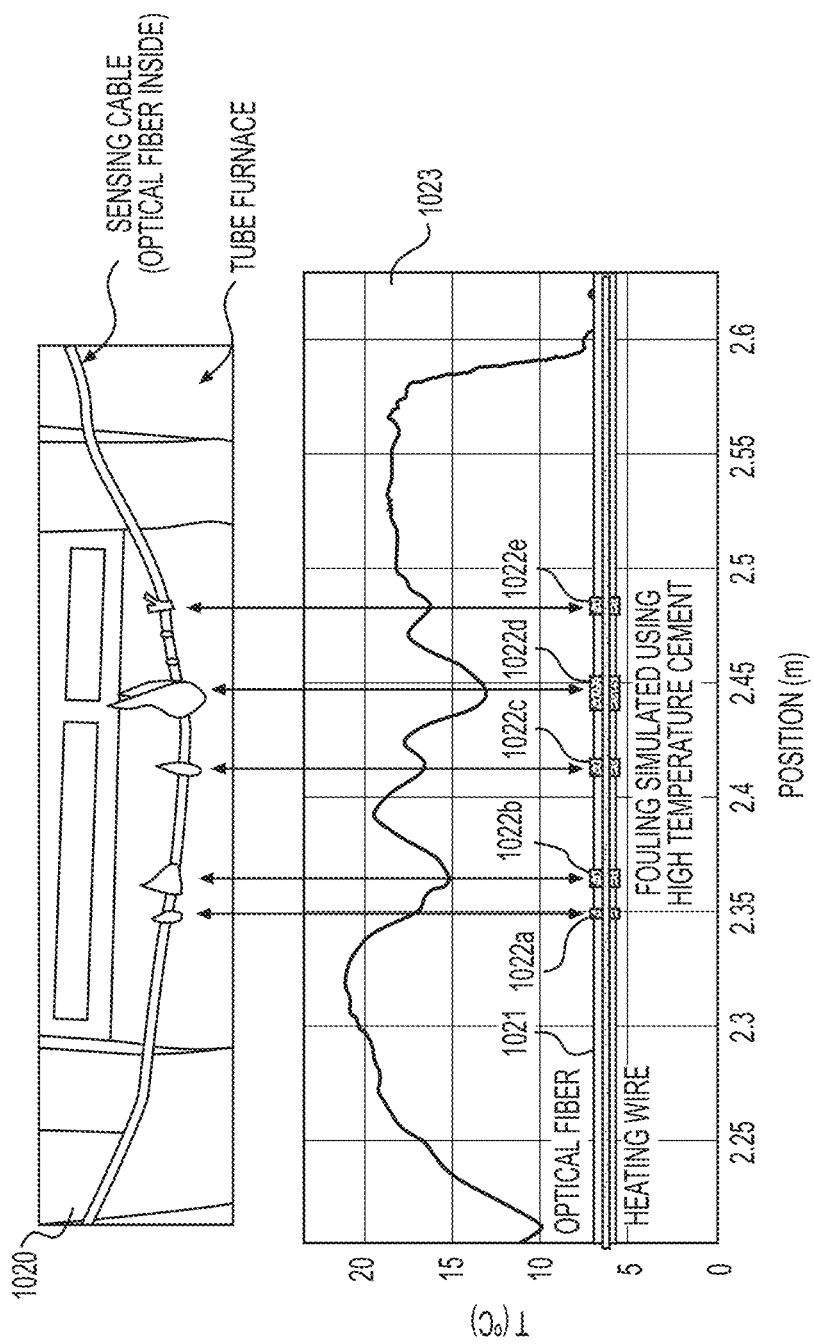
FIG. 9B is an image and graph illustrating another example of a system and method for detecting a deposit in a vessel in accordance with the disclosed subject matter.

Likewise, FIG. 9B provides an image 1020 of a sensing cable 1021 (including a fiber optic sensor array and heating wire) covered with five high temperature cement deposits (1022a, 1022b, 1022c. 1022d, and 1022e [collectively, 1022]). For purpose of demonstration, the sensing cable 1021 is placed in, for example, a furnace tube operating at approximately 400° C. As a heat pulse propagates through the heating wire, heat is exchanged between the heating wire, the sensing cable, the surrounding air, and the cement deposits 1022. FIG. 9B includes a plot 1023 of sensor location along the sensing cable 1021 (x-axis) and temperature change induced by the heating wire in sensing cable 1021 (y-axis). Plot 1023 reveals the locations and amount of high temperature cement deposits, where the "dips" in the temperature profile are lower temperature regions caused by extra thermal mass from various sizes of high temperature cement. The 0 point on the y-axis of plot 1023 represents the furnace operating temperature at 400° C. Heat generated by the heating wire is delivered to the sensing cable as thermal perturbation to the environmental thermal equilibrium, and the thermal response of the sensing cable is used to measure the deposit locations and sizes. Thus, this sensing mechanism can enable deposit detection under various temperature conditions, e.g., ranging from cryogenic temperatures up to over 1000° C.

Figure 9C:
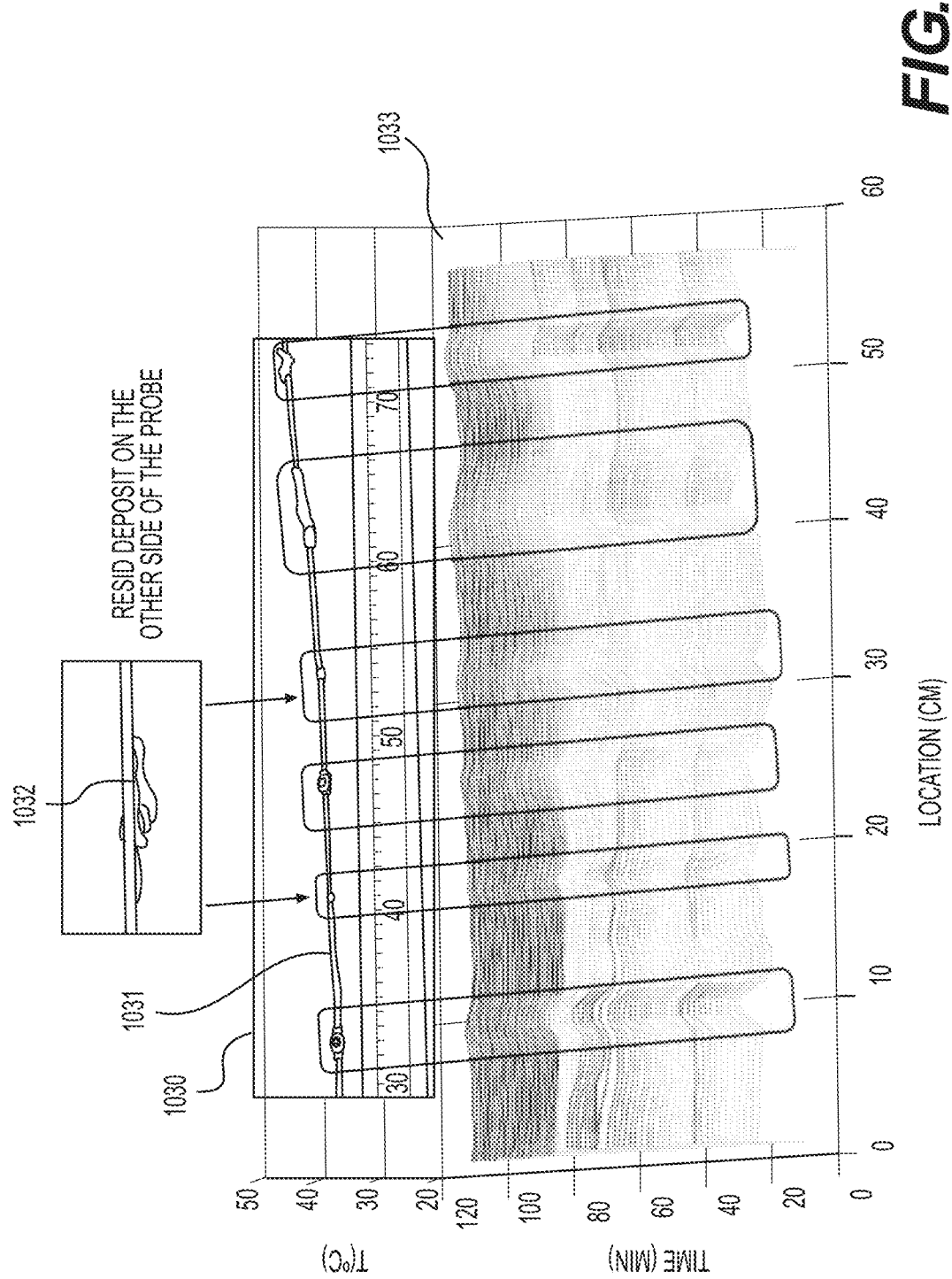
FIG. 9C is an image and graph illustrating another example of a system and method for detecting a deposit in a vessel in accordance with the disclosed subject matter.

FIG. 9C depicts an image 1030 of a sensing cable 1031 with a plurality of resid deposits (including deposit 1032) located at intervals along the sensing cable 1031. For purpose of illustration, the sensing cable 1031 is immersed in gas oil and under room temperature conditions. The techniques disclosed herein are applied, and a plot such as plot 1033 is generated. For example, in connection with FIG. 9C, the heat pulse was propagated as a single heat pulse with a duration of approximately 85 minutes. Plot 1033 depicts the sensor location along the sensing cable (x-axis) as a function of time (y-axis) and depicts the temperature change induced by the heating wire in sensing cable (z-axis). As illustrated by plot 1033, the temperature profile reveals the locations and amount of coke deposits during both heating (e.g., 1~85 min) and cooling (e.g., 85~110 min) and cooling processes. The "peaks" in the temperature profile correspond to higher temperature regions, caused by various sizes of coke, as coke is less thermally conductive than gas oil, temperatures around coke deposits are higher during heating process; and also higher during cooling process because of the higher heat capacity of coke.

As disclosed herein, the control unit thus can be adapted to determine the characteristics of the surrounding media at each sensor location using a variety of techniques, and thereby detect deposits, such as coking, in a vessel, such as a VPS distillation tower. That is, for example, the control unit can be adapted to determine, with reference to the known positions of the sensor locations and the corresponding temperature profiles, a difference in characteristics of the medium surrounding each sensor location and thus detect the location of one or more deposits. In like manner, deposits can be detected by identifying a change in temperature profile between sensor locations.

Figure 9D:
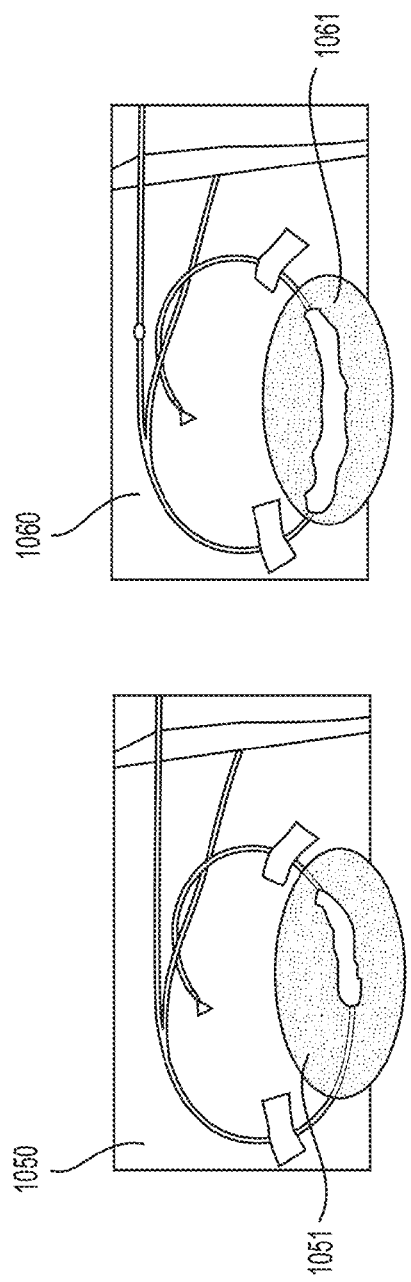
FIG. 9D is an image and graph illustrating another example of a system and method for detecting a deposit in a vessel in accordance with the disclosed subject matter.
Figure 9D:
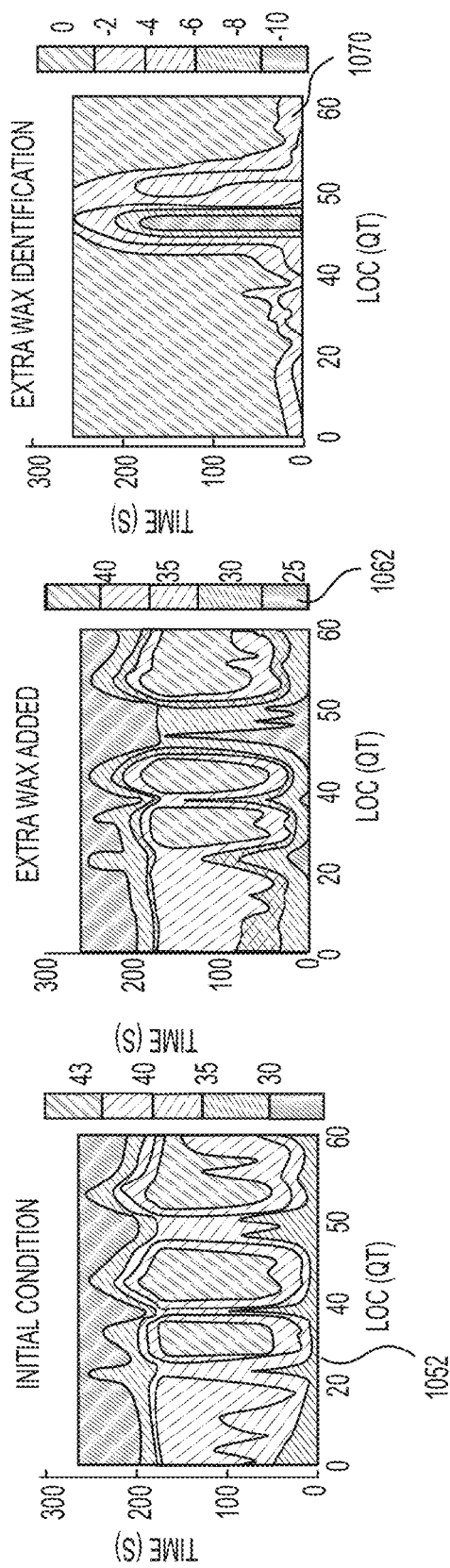

For purpose of illustration, and not limitation, the direct temperature measurement techniques described above can be used to detect deposits in a vessel. Particularly, and with reference to FIG. 9D, temperature profiles can be extracted and processed to determine characteristics of the medium surrounding each sensor location. For example, and as depicted in FIG. 9D, an additional deposit can be detected by comparing the temperature profile of sensor locations before and after deposition. FIG. 9D shows an image 1050 of the sensing cable in an initial condition, with a small amount of wax 1051 deposited over a portion of the sensing cable. Plot 1052 illustrates the temperature profiles of the sensor locations during the initial condition, measured in accordance with the method disclosed herein. An additional amount of wax 1061 can be deposited, as shown in image 1060. Temperature profiles for the sensor locations after deposition can then be measured in accordance with the techniques disclosed herein, as shown in plot 1062. The differential between the temperature profile measured after deposition of the additional wax 1061 relative the temperature profile measured during the initial condition thus can be used to determine the location of the additional wax 1061, as well as the relative size of the additional deposition, as shown in plot 1070. Alternative techniques for detecting size or amount of the deposit also can be used, as described below.

Alternatively, and as described herein with reference to FIG. 4B, a log-time regression technique can be used to determine certain characteristics of the medium surrounding each sensor location by further processing the temperature profile at each sensor location. That is, by performing the regression of the temperature over log of time over an interval of time corresponding to each heat pulse for each sensor location, the resulting slope and intercept of the regression can be used to identify characteristics of the medium. For example, the slope and intercept of sensor locations in proximity to a deposit can be distinguished from the slope and intercept of sensor locations not in proximity to a deposit.

In accordance with another exemplary embodiment of the disclosed subject matter, the frequency spectrum techniques disclosed herein with reference to FIG. 5A-C can be employed to detect deposits, such as coking 825, within a vessel, such as VPS distillation tower 810, with increased measurement sensitivity, accuracy, and/or reliability. In this exemplary embodiment, and as described above, an N-pulse train can be propagated through the heating wire of the sensing cable 101 with pre-selected parameters, including heating cycle period, $t_0$, number of heating cycles, N, and current amplitude, $I_0$. The parameters can be selected according to the operating characteristics of the VPS distillation tower 810 such that the resulting temperature profile can be measured with a desired signal-to-noise ratio. For example, a short heating cycle period or low current amplitude can result in higher signal-to-noise ratio relative to a longer heating cycle period or high current amplitude. Likewise, an increase in the number of heating cycles can further reduce the signal-to-noise ratio. One of ordinary skill in the art will appreciate that such parameters can be varied depending upon desired application. For example, if detection of deposits is desired at short time intervals, a shorter heating cycler period and a higher current amplitude can be employed. For purpose of example, and not limitation, in connection with a wash bed 820 in a VPS distillation tower 810 having a diameter of approximately 20 to approximately 40 feet, approximately 4 to 5 layers of wash bed packing materials, and a total height of approximately 6 to approximately 10 feet. The heating cycle period for the sensing cable can be approximately 1 Hz or slower (i.e., the excitation source can be adapted to deliver a current pulse at 1 Hz or slower. The current amplitude can be several miliamperes to several amperes. One of ordinary skill in the art will appreciate that, in accordance with the disclosed subject matter, suitable frequency and current amplitude can be determined for a particular application by routine testing in accordance with known methods.

The optical signal interrogator 104 can be adapted to measure temperatures from the optical fiber at a pre-selected sampling frequency. In accordance with an exemplary embodiment, the sampling frequency can be at least twice the expected frequency of the temperature profile and/or heat pulse. For example, and not limitation, in connection with a VPS distillation tower 810, the sampling frequency can be 10 Hz or less. The derivative with respect to time of the temperature measurements for each sensor location can then be generated. For example, the measured temperatures a sensor location at each sampling interval can be given as a temperature series. The difference between each temperature in the series can then be calculated to generate a temperature derivative series. A transform (e.g., a FFT or DFT) can be applied to convert the temperature derivative series into the frequency domain, and thus generate a spectrum of time series of temperature differences for each sensor location. The derivative of the spectrum, with respect to the frequency, can be generated. The amplitude and phase of the frequency-derivative spectrum (e.g., the real and imaginary parts of the complex frequency-derivative spectrum) can then be determined. For example, using the heating cycle period, $t_0$, the real and imaginary values of the spectrum at the fundamental frequency of the N-pulse train can be selected as $f_0=1/t_0$.

The amplitude and phase of the frequency-derivative spectrum at each sensor location thus corresponds to certain characteristics of the medium surrounding the sensing cable 101 at a particular sensor location. For example, the amplitude and phase can decrease monotonically with frequency so that higher frequency corresponds with lower response to a change in temperature from the heating element. Accordingly, lower frequencies can obtain significant heating response and higher signals. Additionally, the imaginary part of the complex spectrum can be nearly linear with the frequency while the real part can exhibit linear behavior beyond certain frequency values. Therefore, the derivative of the transfer function spectrum with respect to frequency can correspond to the linear relationship of the temperature change with log(t) in the time domain. In this manner, the amplitude and phase of sensor locations exposed to deposit can be distinguishable from the amplitude and phase of sensor locations exposed to other media in the vessel, such as oil, gas, solid deposit (e.g., coking) or other effluent.

The sensing cable 101 can be calibrated, e.g., with the control unit. Calibration can include, for example, calibrating the sensor array to determine the amplitude and phase of the frequency-derivative spectrum of certain known media. For example, a number of materials with known thermal properties can be measured for a broad range of values and a database can be constructed including correlations between the generated amplitude and phase and characteristics of the known materials. The database can then be used as to determine characteristics surrounding medium at a particular sensor location in the vessel, including the medium's composition, size, amount, and/or location.

The control unit 106, with reference to the known locations of each sensor and the corresponding amplitude and phase of the frequency-derivative spectrum, can detect the location and/or other characteristics (such as size) of different deposits in the vessel 810. To determine the location of a deposit, e.g., deposit 825 on wash bed 820, the control unit can be configured to store the known position of each sensor location in one or more memories. For example, for a 36 inch long sensing cable, having 36 sensor locations each spaced apart by a unit inch, positioned about the surface of a 36 inch wash bed 820, the control unit can store the distance of each sensor location from the wall of the vessel 810 (i.e., for sensor location $i=\{1, 2, \ldots, 36\}$, the control unit can store a corresponding distance measurement $D_i=\{1 \text{ in}, 2 \text{ in}, \ldots, 36 \text{ in}\}$). For each sensor location, i, the control unit can determine the amplitude and phase of the frequency derivative spectrum as disclosed herein. With reference to, for example, a database storing the amplitude and phase of the frequency derivative spectrum for known deposits, the control unit can thus determine whether each sensor location is in proximity to a deposit using the determined amplitude and phase at each sensor location.

Additionally or alternatively, and as embodied herein, the control unit can process the determined amplitude or phase of the frequency derivative spectrum of adjacent sensor locations to detect deposits. That is, for example, assuming the vessel contains media with otherwise constant characteristics, a change in the amplitude across two sensor locations can correspond to deposit between those sensors. Likewise, a change in the phase can correspond to a deposit. In certain embodiments, the control unit can process both the amplitude and phase of adjacent sensors to enhance detection of deposits. For example, a change in both the amplitude and phase can correspond to a deposit. Moreover, in certain embodiments, the control unit can monitor the amplitude and phase of each sensor location over time (e.g., throughout the operation of a VPS distillation tower 810) and determine whether the temperature profile of one or more sensor locations changes with time. For example, the control unit can be configured to monitor the temperature profile of one or more sensor locations over time, identify a change in said temperature profile and, with reference, e.g., to a database of known characteristics corresponding to a deposit, detect the formation of a deposit.

The techniques disclosed herein can provide for continuous deposit sensing, such as coking or fouling, in real time. No moving mechanical parts need be included inside the sensing cable. Because material thermal properties can be measured for deposit detection, the measurement results can be independent of electrical conductivity, salinity, and crude oil constituents, such as sulfur, iron sulfide/oxide. Moreover, relative temperature changes before and after heating/cooling can be used to infer material thermal properties for deposit detection, and temperature baseline can be taken each time before heating/cooling is applied. Accordingly, the techniques disclosed herein need not require long term stability for temperature sensors.

Moreover, the system disclosed herein can operate at temperatures ranging from cryogenic temperatures up to over 1000° C. The size of the sensing cable can be relatively small (e.g., compared to conventional thermocouples) and can be cost effective for large area coverage with a large amount of sensors. Utilizing cost-effective optical fiber temperature sensors, the system disclosed herein can incorporate a large number of sensors, and can offer a high spatial resolution, e.g., less than 1 mm, over a long measurement range, e.g., several meters to kilometers. The diameter of the compact sensing cable can small, e.g., less than 2 mm. The small diameter of the sensing cable can allow for measurement in a tight space with reduced intrusiveness. Furthermore, the heating/cooling element can be turned off, and the sensing cable can be converted to a temperature sensor, which can provide absolute temperature measurements inside the vessel, such as measurements of the wash bed packing materials. Such absolute temperature measurements can be used to infer liquid/vapor distributions, for example, inside packing materials.

Based upon the above, for purpose of illustration and not limitation, systems and methods are provided in accordance with the disclosed subject matter for detecting coking in a wash bed of a vacuum pipe still. As embodied herein, the method includes providing within a vacuum pipe still a sensing cable including an optical fiber sensor array aligned with a heating element and measuring a first temperature profile of the sensing cable at a plurality of sensor locations. A flow distribution of fluids within the vacuum pipe still is determined by identifying a first set of sensor locations of the sensing cable exposed to vapor and a second set sensor locations of the sensing cable exposed to liquid based on the first temperature profile. The method further includes propagating at least one heat pulse through the heating element along at least a portion of the sensing cable to affect an exchange of thermal energy between the heating element and media, including the fluids, exposed to the sensing cable. At least a second temperature profile of the sensing cable corresponding to the heat pulse at each of the plurality of sensor locations of the optical fiber sensor array is measured over time. Coking is detected by determining one or more properties of the media exposed to the sensing cable at each of the plurality of sensor locations based on the second temperature profile corresponding thereto.

In accordance with certain embodiments, the systems and methods described herein for determining a flow distribution of a fluid through a component and for detecting a deposit in a vessel can be used, either alone or in combination, for detecting coking in a wash bed of a VPS distillation tower. For purpose of illustration, and not limitation, description will be made of exemplary systems and methods for detecting coking in a wash bed of a VPS distillation tower with reference to FIG. 12. Passive temperature measurements can be taken at each sensor location along the sensing cable to measure a first temperature profile and detect vapor/liquid distribution along the sensing cable. Because hydrocarbon vapor within the VPS distillation tower generally will be warmer than wash oil (e.g., Vacuum Gas Oil ["VGO"]), sensor locations exposed to the wash oil can be identified as having a lower absolute temperature during passive temperature measurement, as depicted in plot 1310. Additionally or alternatively, the active heating techniques disclosed herein can be employed to determine the first temperature profile and the vapor/liquid distribution.

A defined waveform of electrical pulse (e.g., a square wave) can be propagated along the length of the sensing cable via, e.g., a heating wire. A second temperature profile at each sensor location (e.g., as depicted in plot 1320) can be monitored using the fiber optic sensor array and optical signal interrogator. As described above, the temperature change at each sensor location along the sensing cable corresponds to the thermal characteristics of the media surrounding the sensor location. Thus, variations of the temperature profiles along at sensor locations along the sensing cable can be used directly to indicate the location and amount of coking, as illustrated by plot 1330. Additionally, the log-time regression and frequency spectrum methods disclosed herein can be used to further enhance determination of the thermal characteristics of the media surrounding the sensor locations, and thus the degree and location of a deposit.

Because wet resid deposit and VGO wash oil can have different thermal characteristics, wet resid deposition on the sensing cable can be detected before the resid starts to coke.

The heating element can then be turned off, and the corresponding decrease in temperature until thermal equilibrium is reached, at each sensor location can be measured to detect and confirm coking and non-coking regions along the sensing cable in dry and wet regions separately. Detecting the coking formation at an early stage along with its location within the wash bed in a VPS distillation tower can allow for mitigation strategies, such as a high flow rate of wash oil to remove the coking.

Figure 12:
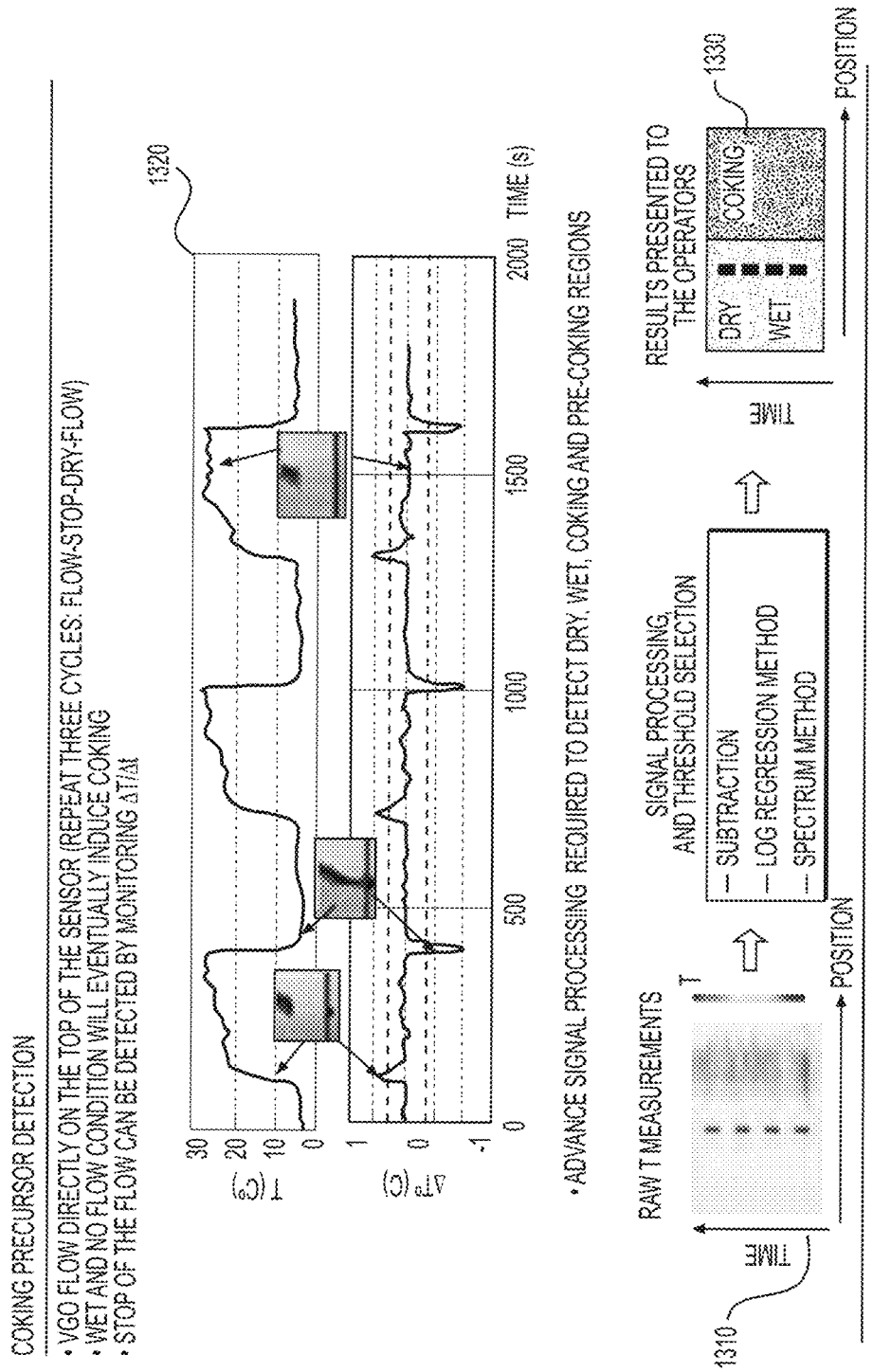
FIG. 12 is a flow diagram and graphs illustrating an exemplary method for detecting coking in a wash bed of a vacuum pipe still distillation tower.

In connection with certain embodiments, operating parameters of the VPS distillation tower can be modulated and detected with regard to measurement of the first temperature profile and the second temperature profile at each sensor location. For example, and not limitation, VGO flow can be provided during measurement of the first temperature profile to identify dry and wet locations along the sensing cable (e.g., liquid/gas distribution) using the systems and methods above. The VGO flow can be stopped during measurement of the second temperature profile at each sensor location to identify coking locations. Interruption of the VGO flow can be identified according to the techniques disclosed herein by monitoring the derivative of temperature at each sensor location with respect to time. Sensor locations corresponding to wet regions and lack of liquid flow can induce coking, and operating parameters of the VPS distillation tower can be adjusted to mitigate the formation of coking. Alternatively, in connection with certain embodiments, the first temperature profile can be used in combination with the second temperature profile at each sensor location to account for flow of fluids exposed to the sensor locations. For example, the liquid/gas distribution over the sensor locations can be used to determine an amount of heat loss at each sensor location due to convective heat transfer corresponding to the flow. In this manner, conductive heat loss due to the properties of the media exposed to each sensor location can be determined from the second temperature profile at each sensor location, and thus coking in both dry and wet regions can be identified, as shown in FIG. 12.

In another exemplary embodiment, for purpose of illustration, multiple layers of sensors can be deployed between different layers of packing materials, for example as depicted in FIG. 8. In the manner described above, measurement from each layer of sensor can be used to determine localized conditions within the vessel, such as whether each sensor location is in proximity to VGO wash oil, vapor, coking or the like. Measurement at each sensor location thus establishes localized conditions (dry, wet, coking or liquid flow rate), and entrainment of resid can be inferred by comparison of the measurements across other sensor layers.

ADDITIONAL EMBODIMENTS

Additionally or alternatively, the invention can include one or more of the following embodiments.

Embodiment 1

A method for detecting coking in a wash bed of a vacuum pipe still, comprising: providing within a vacuum pipe still a sensing cable including an optical fiber sensor array aligned with a heating element; measuring a first temperature profile of the sensing cable at a plurality of sensor locations; determining a flow distribution of fluids within the vacuum pipe still by identifying a first set of sensor locations of the sensing cable exposed to vapor and a second set of sensor locations of the sensing cable exposed to liquid based on the first temperature profile; propagating at least one heat pulse through the heating element along at least a portion of the sensing cable to affect an exchange of thermal energy between the heating element and media, including the fluids, exposed to the sensing cable; measuring, over time, at least a second temperature profile of the sensing cable corresponding to the heat pulse at each of the plurality of sensor locations of the optical fiber sensor array: and detecting coking by determining one or more properties of the media exposed to the sensing cable at each of the plurality of sensor locations based on the second temperature profile corresponding thereto.

Embodiment 2 the method of any of the previous embodiments, wherein measuring the first temperature profile and the second temperature profile includes measuring using fiber Bragg grating array based sensing, Raman scattering based sensing, Rayleigh scattering based sensing, or Brillioun scattering based sensing.

Embodiment 3 the method of any of the previous embodiments, wherein the heating element includes a resistive heating element and wherein propagating the at least one heat pulse includes applying an electrical pulse with a predetermined frequency and predetermined waveform.

Embodiment 4 the method of any of the previous embodiments, wherein propagating at least one heat pulse through the heating element includes propagating the at least one heat pulse through a heating element aligned adjacent to the optical fiber sensor array.

Embodiment 5 the method of embodiments 1, 2 or 3, wherein propagating at least one heat pulse through the heating element includes propagating the at least one heat pulse through a heating element disposed concentrically with the optical fiber sensor array.

Embodiment 6 the method of embodiments 1, 2, 4 or 5, wherein the heating element includes a thermoelectric device and wherein propagating at least one heat pulse through the heating element includes propagating cooling pulse.

Embodiment 7 the method of any of the previous embodiments, wherein measuring the first temperature profile includes passively measuring a temperature at each sensor location.

Embodiment 8 the method of embodiments 1, 2, 3, 4, 5 or 6, wherein measuring the first temperature profile further includes propagating a heat pulse through the heating element along at least a portion of the sensing cable and, for each sensor location, measuring at least a heating temperature measurement during propagation of the heat pulse over the sensor location, a peak temperature measurement, and a cooling temperature measurement after propagation of the heat pulse over the sensor.

Embodiment 9 the method of embodiment 8, wherein determining the flow distribution of the fluids includes calculating a difference in the heating temperature measurement, the peak temperature measurement, the cooling temperature measurement, or combination thereof, between sensor locations, wherein the difference indicates a change in fluid characteristic proximal at least one of the plurality of sensor locations if the difference exceeds a predetermined threshold.

Embodiment 10 the method of any of the previous embodiments, wherein the media includes a coking deposit.

Embodiment 11 the method of any of the previous embodiments, wherein measuring the second temperature profile corresponding to the heat pulse at each of the plurality of sensor locations includes, for each sensor location, measuring a plurality of temperatures over a period of time upon arrival the heat pulse at the sensor location.

Embodiment 12 the method of embodiment 11, wherein detecting coking includes, for each temperature profile, performing a regression of the plurality of temperatures over a logarithm of corresponding measurement times for a predetermined time window in the period of time to generate a slope and an intercept of the regression, wherein the slope and the intercept indicate a coking deposit proximal the sensor location.

Embodiment 13 the method embodiment 12, wherein the predetermined time window includes a time window during a heating stage, the heating stage corresponding to a period of time during propagation of the heat pulse over the sensor location or a time window during a cooling stage, the cooling stage corresponding to a period of time after propagation of the heat pulse over the sensor.

Embodiment 14 the method of embodiments 11, 12 or 13, wherein detecting coking includes, for each temperature profile: generating a time derivative by calculating a derivative of the plurality of temperature measurements with respect to time; applying a transform to the time derivative to generate a complex spectrum; and determining an amplitude and a phase of the complex spectrum, wherein the amplitude and the phase of the complex spectrum indicate a coking deposit proximal the sensor location.

Embodiment 15 the method of embodiment 14, wherein detecting coking further includes, for each temperature profile: generating a frequency derivative spectrum by calculating the derivative of the complex spectrum with respect to frequency; and determining an amplitude and a phase of the frequency derivative spectrum, wherein the amplitude and the phase of the frequency derivative spectrum indicate a coking deposit proximal the sensor location.

Embodiment 16 the method of any of the previous embodiments, wherein determining the flow distribution of the fluids within the vacuum pipe still further includes detecting a misdistribution condition in the wash bed by monitoring the second temperature profile corresponding to each of the plurality of sensor locations, and comparing the monitored temperature profiles to predetermined temperature profiles corresponding to a desired operation condition.

Embodiment 17 the method of any of the previous embodiments, wherein determining the flow of the fluids within the vacuum pipe still further includes detecting a misdistribution condition in the wash bed by monitoring the second temperature profile corresponding to each of the plurality of sensor locations and at least a third temperature profile corresponding to each of the plurality of sensor locations, and comparing the second and third temperature profiles to detect a change in operation condition.

Embodiment 18 the method of any of the previous embodiments, wherein the sensing cable is disposed in a grid configuration within the wash bed, the method further comprising generating a multi-dimensional flow distribution based on the first temperature profile corresponding to each sensor location.

Embodiment 19 the method of any of the previous embodiments, wherein the sensing cable further includes a plurality of sensing cables, wherein each of the plurality of sensing cables is disposed within different layers of the wash bed, and wherein the control unit is further configured to generate a multi-dimensional flow distribution based on the first temperature profile corresponding to each sensor location.

Embodiment 20 the method of any of the previous embodiments, wherein the vacuum pipe still has an operating temperature between cryogenic temperatures and approximately 1000° C., wherein the sensing cable has a diameter of less than 2 mm, and wherein the optical signal interrogator is configured to measure the temperature profile at a spatial resolution less than 1 mm.

Embodiment 21

A system for detecting coking in a wash bed of a vacuum pipe still, comprising: a sensing cable including an optical fiber sensor array aligned with a heating element disposed in the wash bed, the optical fiber sensor array having a plurality of sensor locations; an optical signal interrogator coupled with the optical fiber sensor array and adapted to receive a signal from each of the plurality of sensor locations and configured to measure a first temperature profile of the sensing cable at the plurality of sensor locations; a control unit, coupled with the heating element and the optical signal interrogator, configured to determine a flow distribution of fluids within the vacuum pipe still by identifying a first set of sensor locations of the sensing cable exposed to vapor and a second set of sensor locations of the sensing cable exposed to liquid based on the first temperature profile; and an excitation source coupled with the heating element and configured to propagate at least one heat pulse through the heating element along at least a portion of the sensing cable to affect an exchange of thermal energy between the heating element and media, including the fluids, exposed to the sensing cable; wherein the optical signal interrogator is configured to measure, over time, a second temperature profile of the sensing cable corresponding to the heat pulse at each of the plurality of sensor locations of the optical fiber sensor array; and wherein the control unit is configured to detect coking by determining one or more properties of the media exposed to the sensing cable at each of the plurality of sensor locations based on the second temperature profile corresponding thereto.

Embodiment 22 the system of embodiment 21, wherein the optical fiber sensor array and the optical signal interrogator include a fiber Bragg grating array based sensing system, a Raman scattering based sensing system, a Rayleigh scattering based sensing system, or a Brillioun scattering based sensing system.

Embodiment 23 the system of embodiments 21 or 22, wherein the heating element includes a resistive heating element and wherein the excitation source is configured to propagate an electrical pulse with a predetermined frequency and predetermined waveform, the electrical pulse corresponding to the at least one heat pulse.

Embodiment 24 the system of embodiments 21, 22 or 23, wherein the heating element is aligned adjacent to the optical fiber sensor array.

Embodiment 25 the system of embodiments 21, 22 or 23, wherein the heating element is disposed concentrically with the optical fiber sensor array.

Embodiment 26 the system of embodiments 21, 22, 24 or 25, wherein the heating element includes a thermoelectric device and wherein the at least one heat pulse including a cooling pulse.

Embodiment 27 the system of embodiments 21, 22, 23, 24, 25 or 26, wherein the excitation source is further configured to propagate a heat pulse through the heating element along at least a portion of the sensing cable prior to measurement of the first temperature profile.

Embodiment 28 the system of embodiments 21, 22, 23, 24, 25, 26 or 27, wherein the optical signal interrogator is configured, for each of the plurality of sensor locations, to measure at least a heating temperature measurement during propagation of the heat pulse over the sensor location, a peak temperature measurement, and a cooling temperature measurement after propagation of the heat pulse over the sensor.

Embodiment 29 the system of embodiments 21, 22, 23, 24, 25, 26, 27 or 28, wherein the media includes a coking deposit.

Embodiment 30 the system of embodiments 21, 22, 23, 24, 25, 26, 27, 28 or 29 wherein the optical signal interrogator is configured, for each of the plurality of sensor locations, to measure a plurality of temperatures over a period of time upon arrival of the heat pulse at the sensor location.

Embodiment 31 the system of embodiment 30, wherein the control unit is configured, for each temperature profile, to perform a regression of the plurality of temperatures over a logarithm of corresponding measurement times for a predetermined time window in the period of time to generate a slope and an intercept of the regression, wherein the slope and the intercept indicate a coking deposit proximal the sensor location.

Embodiment 32 the system of embodiments 31, wherein the predetermined time window includes a time window during a heating stage, the heating stage corresponding to a period of time during propagation of the heat pulse over the sensor location or a time window during a cooling stage, the cooling stage corresponding to a period of time after propagation of the heat pulse over the sensor.

Embodiment 33 the system of embodiments 30, 31 or 32, wherein the control unit is configured, for each temperature profile, to: generate a time derivative by calculating a derivative of the plurality of temperature measurements with respect to time; apply a transform to the time derivative to generate a complex spectrum; and determine an amplitude and a phase of the complex spectrum, wherein the amplitude and the phase of the complex spectrum indicate a coking deposit proximal the sensor location.

Embodiment 34 the system of embodiments 33, wherein the control unit is further configured, for each temperature profile, to: generate a frequency derivative spectrum by calculating the derivative of the complex spectrum with respect to frequency; and determine an amplitude and a phase of the frequency derivative spectrum, wherein the amplitude and the phase of the frequency derivative spectrum indicate a coking deposit proximal the sensor location.

Embodiment 35 the system of embodiments 21, 22, 23, 24, 25, 26, 27, 28, 29, 30, 31, 32, 33, or 34, wherein the control unit is further configured to detect a misdistribution condition in the wash bed by monitoring the second temperature profile corresponding to each of the plurality of sensor locations, and compare the monitored temperature profiles to predetermined temperature profiles corresponding to a desired operation condition.

Embodiment 36 the system of embodiments 21, 22, 23, 24, 25, 26, 27, 28, 29, 30, 31, 32, 33, 34, or 35, wherein the control unit is further configured to detect a misdistribution condition in the wash bed by monitoring the second temperature profile corresponding to each of the plurality of sensor locations and at least a third temperature profile corresponding to each of the plurality of sensor locations, and comparing the second and third temperature profiles to detect a change in operation condition.

Embodiment 37 the system of embodiments 21, 22, 23, 24, 25, 26, 27, 28, 29, 30, 31, 32, 33, 34, 35 or 36, wherein the sensing cable is disposed in a grid configuration within the wash bed, and wherein the control unit is further configured to generate a multi-dimensional flow distribution based on the first temperature profile corresponding to each sensor location.

Embodiment 38 the system of embodiments 21, 22, 23, 24, 25, 26, 27, 28, 29, 30, 31, 32, 33, 34, 35, 36 or 37, wherein the sensing cable further includes a plurality of sensing cables, wherein each of the plurality of sensing cables is disposed within different layers of the wash bed, and wherein the control unit is further configured to generate a multi-dimensional flow distribution based on the first temperature profile corresponding to each sensor location.

Embodiment 39 the system of embodiments 21, 22, 23, 24, 25, 26, 27, 28, 29, 30, 31, 32, 33, 34, 35, 36, 37 or 38, wherein the vacuum pipe still has an operating temperature between cryogenic temperatures and approximately 1000° C., wherein the sensing cable has a diameter of less than 2 mm, and wherein the optical signal interrogator is configured to measure the temperature profile at a spatial resolution less than 1 mm.

While the disclosed subject matter is described herein in terms of certain exemplary embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A method for detecting coking in a wash bed of a vacuum pipe still, comprising:
   providing within a vacuum pipe still a sensing cable including an optical fiber sensor array aligned with a heating element;
   measuring a first temperature profile of the sensing cable at a plurality of sensor locations within the vacuum pipe still;
   determining a flow distribution of fluids within the vacuum pipe still by identifying a first set of sensor locations of the sensing cable exposed to vapor and a second set of sensor locations of the sensing cable exposed to liquid based on the first temperature profile;
   propagating at least one heat pulse through the heating element along at least a portion of the sensing cable to affect an exchange of thermal energy between the heating element and media, including the fluids, exposed to the sensing cable;
   measuring, over time, at least a second temperature profile of the sensing cable corresponding to the heat pulse at each of the plurality of sensor locations of the optical fiber sensor array; and
   detecting coking by determining one or more properties of the media exposed to the sensing cable at each of the plurality of sensor locations based on the second temperature profile corresponding thereto.

2. The method of claim 1, wherein measuring the first temperature profile and the second temperature profile includes measuring using fiber Bragg grating array based sensing, Raman scattering based sensing, Rayleigh scattering based sensing, or Brillioun scattering based sensing.

3. The method of claim 1, wherein the heating element includes a resistive heating element and wherein propagating the at least one heat pulse includes applying an electrical pulse with a predetermined frequency and predetermined waveform.

4. The method of claim 1, wherein propagating at least one heat pulse through the heating element includes propagating the at least one heat pulse through a heating element aligned adjacent to the optical fiber sensor array.

5. The method of claim 1, wherein propagating at least one heat pulse through the heating element includes propagating the at least one heat pulse through a heating element disposed concentrically with the optical fiber sensor array.

6. The method of claim 1, wherein the heating element includes a thermoelectric device and wherein propagating at least one heat pulse through the heating element includes propagating cooling pulse.

7. The method of claim 1, wherein measuring the first temperature profile includes passively measuring a temperature at each sensor location.

8. The method of claim 1, wherein measuring the first temperature profile further includes propagating a heat pulse through the heating element along at least a portion of the sensing cable and, for each sensor location, measuring at least a heating temperature measurement during propagation of the heat pulse over the sensor location, a peak temperature measurement, and a cooling temperature measurement after propagation of the heat pulse over the sensor.

9. The method of claim 8, wherein determining the flow distribution of the fluids includes calculating a difference in the heating temperature measurement, the peak temperature measurement, the cooling temperature measurement, or combination thereof, between sensor locations, wherein the difference indicates a change in fluid characteristic proximal at least one of the plurality of sensor locations if the difference exceeds a predetermined threshold.

10. The method of claim 1, wherein the media includes a coking deposit.

11. The method of claim 1, wherein determining the flow distribution of the fluids within the vacuum pipe still further includes detecting a misdistribution condition in the wash bed by monitoring the second temperature profile corresponding to each of the plurality of sensor locations, and comparing the monitored temperature profiles to predetermined temperature profiles corresponding to a desired operation condition.

12. The method of claim 1, wherein determining the flow of the fluids within the vacuum pipe still further includes detecting a misdistribution condition in the wash bed by monitoring the second temperature profile corresponding to each of the plurality of sensor locations and at least a third temperature profile corresponding to each of the plurality of sensor locations, and comparing the second and third temperature profiles to detect a change in operation condition.

13. The method of claim 1, wherein the sensing cable is disposed in a grid configuration within the wash bed, the method further comprising generating a multi-dimensional flow distribution based on the first temperature profile corresponding to each sensor location.

14. The method of claim 1, wherein the sensing cable further includes a plurality of sensing cables, wherein each of the plurality of sensing cables is disposed within different layers of the wash bed, and wherein the control unit is further configured to generate a multi-dimensional flow distribution based on the first temperature profile corresponding to each sensor location.

15. The method of claim 1, wherein the vacuum pipe still has an operating temperature between cryogenic temperatures and approximately 1000° C., wherein the sensing cable has a diameter of less than 2 mm, and wherein the optical signal interrogator is configured to measure the temperature profile at a spatial resolution less than 1 mm.

16. A method for detecting coking in a wash bed of a vacuum pipe still, comprising:
providing within a vacuum pipe still a sensing cable including an optical fiber sensor array aligned with a heating element;
measuring a first temperature profile of the sensing cable at a plurality of sensor locations;
determining a flow distribution of fluids within the vacuum pipe still by identifying a first set of sensor locations of the sensing cable exposed to vapor and a second set of sensor locations of the sensing cable exposed to liquid based on the first temperature profile;
propagating at least one heat pulse through the heating element along at least a portion of the sensing cable to affect an exchange of thermal energy between the heating element and media, including the fluids, exposed to the sensing cable;
measuring, over time, at least a second temperature profile of the sensing cable corresponding to the heat pulse at each of the plurality of sensor locations of the optical fiber sensor array, wherein measuring the second temperature profile corresponding to the heat pulse at each of the plurality of sensor locations includes, for each sensor location, measuring a plurality of temperatures over a period of time upon arrival the heat pulse at the sensor location; and
detecting coking by determining one or more properties of the media exposed to the sensing cable at each of the plurality of sensor locations based on the second temperature profile corresponding thereto, wherein detecting coking includes, for each temperature profile, performing a regression of the plurality of temperatures over a logarithm of corresponding measurement times for a predetermined time window in the period of time to generate a slope and an intercept of the regression, wherein the slope and the intercept indicate a coking deposit proximal the sensor location.

17. The method of claim 16, wherein the predetermined time window includes a time window during a heating stage, the heating stage corresponding to a period of time during propagation of the heat pulse over the sensor location or a time window during a cooling stage, the cooling stage corresponding to a period of time after propagation of the heat pulse over the sensor.

18. A method for detecting coking in a wash bed of a vacuum pipe still, comprising:
providing within a vacuum pipe still a sensing cable including an optical fiber sensor array aligned with a heating element;
measuring a first temperature profile of the sensing cable at a plurality of sensor locations;
determining a flow distribution of fluids within the vacuum pipe still by identifying a first set of sensor locations of the sensing cable exposed to vapor and a second set of sensor locations of the sensing cable exposed to liquid based on the first temperature profile;
propagating at least one heat pulse through the heating element along at least a portion of the sensing cable to affect an exchange of thermal energy between the heating element and media, including the fluids, exposed to the sensing cable;
measuring, over time, at least a second temperature profile of the sensing cable corresponding to the heat pulse at each of the plurality of sensor locations of the optical fiber sensor array, wherein measuring the second temperature profile corresponding to the heat pulse at each of the plurality of sensor locations includes, for each sensor location, measuring a plurality of temperatures over a period of time upon arrival the heat pulse at the sensor location; and
detecting coking by determining one or more properties of the media exposed to the sensing cable at each of the plurality of sensor locations based on the second temperature profile corresponding thereto, wherein detecting coking includes, for each temperature profile:
generating a time derivative by calculating a derivative of the plurality of temperature measurements with respect to time;
applying a transform to the time derivative to generate a complex spectrum; and determining an amplitude and a phase of the complex spectrum, wherein the amplitude and the phase of the complex spectrum indicate a coking deposit proximal the sensor location.

19. The method of claim 18, wherein detecting coking further includes, for each temperature profile:
generating a frequency derivative spectrum by calculating the derivative of the complex spectrum with respect to frequency; and
determining an amplitude and a phase of the frequency derivative spectrum, wherein the amplitude and the phase of the frequency derivative spectrum indicate a coking deposit proximal the sensor location.

20. A system for detecting coking in a wash bed of a vacuum pipe still, comprising:
a sensing cable including an optical fiber sensor array aligned with a heating element disposed in the wash bed, the optical fiber sensor array having a plurality of sensor locations;
an optical signal interrogator coupled with the optical fiber sensor array and adapted to receive a signal from each of the plurality of sensor locations and configured to measure a first temperature profile of the sensing cable at the plurality of sensor locations within the vacuum pipe still;
a control unit, coupled with the heating element and the optical signal interrogator, configured to determine a flow distribution of fluids within the vacuum pipe still by identifying a first set of sensor locations of the sensing cable exposed to vapor and a second set of sensor locations of the sensing cable exposed to liquid based on the first temperature profile; and
an excitation source coupled with the heating element and configured to propagate at least one heat pulse through the heating element along at least a portion of the sensing cable to affect an exchange of thermal energy between the heating element and media, including the fluids, exposed to the sensing cable;
wherein the optical signal interrogator is configured to measure, over time, a second temperature profile of the sensing cable corresponding to the heat pulse at each of the plurality of sensor locations of the optical fiber sensor array; and
wherein the control unit is configured to detect coking by determining one or more properties of the media exposed to the sensing cable at each of the plurality of sensor locations based on the second temperature profile corresponding thereto.

21. The system of claim 20, wherein the optical fiber sensor array and the optical signal interrogator include a fiber Bragg grating array based sensing system, a Raman scattering based sensing system, a Rayleigh scattering based sensing system, or a Brillioun scattering based sensing system.

22. The system of claim 20, wherein the heating element includes a resistive heating element and wherein the excitation source is configured to propagate an electrical pulse with a predetermined frequency and predetermined waveform, the electrical pulse corresponding to the at least one heat pulse.

23. The system of claim 20, wherein the heating element is aligned adjacent to the optical fiber sensor array.

24. The system of claim 20, wherein the heating element is disposed concentrically with the optical fiber sensor array.

25. The system of claim 20, wherein the heating element includes a thermoelectric device and wherein the at least one heat pulse including a cooling pulse.

26. The system of claim 20, wherein the excitation source is further configured to propagate a heat pulse through the heating element along at least a portion of the sensing cable prior to measurement of the first temperature profile.

27. The system of claim 20, wherein the optical signal interrogator is configured, for each of the plurality of sensor locations, to measure at least a heating temperature measurement during propagation of the heat pulse over the sensor location, a peak temperature measurement, and a cooling temperature measurement after propagation of the heat pulse over the sensor.

28. The system of claim 20, wherein the media includes a coking deposit.

29. The system of claim 20, wherein the control unit is further configured to detect a misdistribution condition in the wash bed by monitoring the second temperature profile corresponding to each of the plurality of sensor locations, and compare the monitored temperature profiles to predetermined temperature profiles corresponding to a desired operation condition.

30. The system of claim 20, wherein the control unit is further configured to detect a misdistribution condition in the wash bed by monitoring the second temperature profile corresponding to each of the plurality of sensor locations and at least a third temperature profile corresponding to each of the plurality of sensor locations, and comparing the second and third temperature profiles to detect a change in operation condition.

31. The system of claim 20, wherein the sensing cable is disposed in a grid configuration within the wash bed, and wherein the control unit is further configured to generate a multi-dimensional flow distribution based on the first temperature profile corresponding to each sensor location.

32. The system of claim 20, wherein the sensing cable further includes a plurality of sensing cables, wherein each of the plurality of sensing cables is disposed within different layers of the wash bed, and wherein the control unit is further configured to generate a multi-dimensional flow distribution based on the first temperature profile corresponding to each sensor location.

33. The system of claim 20, wherein the vacuum pipe still has an operating temperature between cryogenic temperatures and approximately 1000° C., wherein the sensing cable has a diameter of less than 2 mm, and wherein the optical signal interrogator is configured to measure the temperature profile at a spatial resolution less than 1 mm.

34. A system for detecting coking in a wash bed of a vacuum pipe still, comprising:
a sensing cable including an optical fiber sensor array aligned with a heating element disposed in the wash bed, the optical fiber sensor array having a plurality of sensor locations;
an optical signal interrogator coupled with the optical fiber sensor array and adapted to receive a signal from each of the plurality of sensor locations and configured to measure a first temperature profile of the sensing cable at the plurality of sensor locations, wherein the optical signal interrogator is configured, for each of the plurality of sensor locations, to measure a plurality of temperatures over a period of time upon arrival of the heat pulse at the sensor location;
a control unit, coupled with the heating element and the optical signal interrogator, configured to determine a flow distribution of fluids within the vacuum pipe still by identifying a first set of sensor locations of the sensing cable exposed to vapor and a second set of sensor locations of the sensing cable exposed to liquid based on the first temperature profile; and an excitation source coupled with the heating element and configured to propagate at least one heat pulse through the heating element along at least a portion of the sensing cable to affect an exchange of thermal energy between the heating element and media, including the fluids, exposed to the sensing cable;

wherein the optical signal interrogator is configured to measure, over time, a second temperature profile of the sensing cable corresponding to the heat pulse at each of the plurality of sensor locations of the optical fiber sensor array; and wherein the control unit is configured to detect coking by determining one or more properties of the media exposed to the sensing cable at each of the plurality of sensor locations based on the second temperature profile corresponding thereto, wherein the control unit is configured, for each temperature profile, to perform a regression of the plurality of temperatures over a logarithm of corresponding measurement times for a predetermined time window in the period of time to generate a slope and an intercept of the regression, wherein the slope and the intercept indicate a coking deposit proximal the sensor location.

35. The system of claim 34, wherein the predetermined time window includes a time window during a heating stage, the heating stage corresponding to a period of time during propagation of the heat pulse over the sensor location or a time window during a cooling stage, the cooling stage corresponding to a period of time after propagation of the heat pulse over the sensor.

36. A system for detecting coking in a wash bed of a vacuum pipe still, comprising:

a sensing cable including an optical fiber sensor array aligned with a heating element disposed in the wash bed, the optical fiber sensor array having a plurality of sensor locations;

an optical signal interrogator coupled with the optical fiber sensor array and adapted to receive a signal from each of the plurality of sensor locations and configured to measure a first temperature profile of the sensing cable at the plurality of sensor locations, wherein the optical signal interrogator is configured, for each of the plurality of sensor locations, to measure a plurality of temperatures over a period of time upon arrival of the heat pulse at the sensor location;

a control unit, coupled with the heating element and the optical signal interrogator, configured to determine a flow distribution of fluids within the vacuum pipe still by identifying a first set of sensor locations of the sensing cable exposed to vapor and a second set of sensor locations of the sensing cable exposed to liquid based on the first temperature profile; and an excitation source coupled with the heating element and configured to propagate at least one heat pulse through the heating element along at least a portion of the sensing cable to affect an exchange of thermal energy between the heating element and media, including the fluids, exposed to the sensing cable;

wherein the optical signal interrogator is configured to measure, over time, a second temperature profile of the sensing cable corresponding to the heat pulse at each of the plurality of sensor locations of the optical fiber sensor array; and wherein the control unit is configured to detect coking by determining one or more properties of the media exposed to the sensing cable at each of the plurality of sensor locations based on the second temperature profile corresponding thereto, wherein the control unit is configured, for each temperature profile, to:

generate a time derivative by calculating a derivative of the plurality of temperature measurements with respect to time;

apply a transform to the time derivative to generate a complex spectrum; and determine an amplitude and a phase of the complex spectrum, wherein the amplitude and the phase of the complex spectrum indicate a coking deposit proximal the sensor location.

37. The system of claim 36, wherein the control unit is further configured, for each temperature profile, to:

generate a frequency derivative spectrum by calculating the derivative of the complex spectrum with respect to frequency; and determine an amplitude and a phase of the frequency derivative spectrum, wherein the amplitude and the phase of the frequency derivative spectrum indicate a coking deposit proximal the sensor location.

38. A method for detecting coking and flow maldistribution in a catalyst bed of a hydroprocessing reactor, comprising:

providing within a catalyst bed of a hydroprocessing reactor a sensing cable including an optical fiber sensor array aligned with a heating element;

measuring a first temperature profile of the sensing cable at a plurality of sensor locations;

determining a flow distribution of fluids within the catalyst bed by identifying a first set of sensor locations of the sensing cable exposed to vapor and a second set of sensor locations of the sensing cable exposed to liquid based on the first temperature profile;

propagating at least one heat pulse through the heating element along at least a portion of the sensing cable to affect an exchange of thermal energy between the heating element and media, including the fluids, exposed to the sensing cable;

measuring, over time, at least a second temperature profile of the sensing cable corresponding to the heat pulse at each of the plurality of sensor locations of the optical fiber sensor array;

detecting a misdistribution condition in the catalyst bed by monitoring the second temperature profile corresponding to each of the plurality of sensor locations, and comparing the monitored temperature profiles to predetermined temperature profiles corresponding to a desired operation condition; and detecting coking within the catalyst bed by determining one or more properties of the media exposed to the sensing cable at each of the plurality of sensor locations based on the second temperature profile corresponding thereto.

39. A system for detecting coking and flow maldistribution in a catalyst bed of a hydroprocessing reactor, comprising:

a sensing cable including an optical fiber sensor array aligned with a heating element disposed within a catalyst bed of a hydroprocessing reactor, the optical fiber sensor array having a plurality of sensor locations;

an optical signal interrogator coupled with the optical fiber sensor array and adapted to receive a signal from each of the plurality of sensor locations and configured to measure a first temperature profile of the sensing cable at the plurality of sensor locations;

a control unit, coupled with the heating element and the optical signal interrogator, configured to determine a flow distribution of fluids within the catalyst bed by identifying a first set of sensor locations of the sensing cable exposed to vapor and a second set of sensor locations of the sensing cable exposed to liquid based on the first temperature profile; and an excitation source coupled with the heating element and configured to propagate at least one heat pulse through the heating element along at least a portion of the sensing cable to affect an exchange of thermal energy between the heating element and media, including the fluids, exposed to the sensing cable;

wherein the optical signal interrogator is configured to measure, over time, a second temperature profile of the sensing cable corresponding to the heat pulse at each of the plurality of sensor locations of the optical fiber sensor array; and wherein the control unit is configured to detect coking by determining one or more properties of the media exposed to the sensing cable at each of the plurality of sensor locations based on the second temperature profile corresponding thereto, wherein the control unit is configured to detect a misdistribution condition in the catalyst bed by monitoring the second temperature profile corresponding to each of the plurality of sensor locations, and comparing the monitored temperature profiles to predetermined temperature profiles corresponding to a desired operation condition.

* * * * *